(12) United States Patent
Junge et al.

(10) Patent No.: US 10,336,940 B2
(45) Date of Patent: Jul. 2, 2019

(54) DEVICE FOR REGULATING THE ENTRY OF LIGHT

(71) Applicant: MERCK PATENT GMBH, Darmstadt (DE)

(72) Inventors: Michael Junge, Pfungstadt (DE); Andreas Beyer, Hanau (DE); Ursula Patwal, Reinheim (DE)

(73) Assignee: MERCK PATENT GMBH, Darmstadt (DE)

( * ) Notice: Subject to any disclaimer, the term of this patent is extended or adjusted under 35 U.S.C. 154(b) by 8 days.

(21) Appl. No.: 15/029,358

(22) PCT Filed: Sep. 22, 2014

(86) PCT No.: PCT/EP2014/002564
§ 371 (c)(1),
(2) Date: Apr. 14, 2016

(87) PCT Pub. No.: WO2015/055274
PCT Pub. Date: Apr. 23, 2015

(65) Prior Publication Data
US 2016/0257885 A1 Sep. 8, 2016

(30) Foreign Application Priority Data

Oct. 17, 2013 (EP) .................................... 13004971

(51) Int. Cl.
*E04B 9/24* (2006.01)
*C09K 19/02* (2006.01)
(Continued)

(52) U.S. Cl.
CPC ........ *C09K 19/601* (2013.01); *C09K 19/0208* (2013.01); *C09K 19/586* (2013.01);
(Continued)

(58) Field of Classification Search
None
See application file for complete search history.

(56) References Cited

U.S. PATENT DOCUMENTS 5,067,795 A * 11/1991 Senatore ............. G02F 1/13725
349/116
7,295,274 B1 † 11/2007 Wu
(Continued)

FOREIGN PATENT DOCUMENTS

| CN | 1672086 A | 9/2005 |
|----|-----------|--------|
| JP | H0566425 A | 9/1993 |

(Continued)

OTHER PUBLICATIONS

International Search Report and Written Opinion from PCT/EP2014/002564 dated Dec. 16, 2014.
(Continued)

*Primary Examiner* — Ryan Crockett
(74) *Attorney, Agent, or Firm* — Millen, White, Zelano & Branigan, PC

(57) ABSTRACT

The application relates to a device for regulating the entry of light into a room, which comprises a switchable layer of specific design comprising a twisted nematic liquid-crystalline medium and a dichroic compound.

24 Claims, 1 Drawing Sheet

(51) Int. Cl.
*C09K 19/58* (2006.01)
*C09K 19/60* (2006.01)
*G02F 1/137* (2006.01)
*G02F 1/139* (2006.01)
*G02F 1/1333* (2006.01)
*G02F 1/1335* (2006.01)
*G02F 1/1337* (2006.01)
*G02F 1/1347* (2006.01)
*E06B 9/24* (2006.01)

(52) U.S. Cl.
CPC ............ *C09K 19/60* (2013.01); *C09K 19/603* (2013.01); *C09K 19/606* (2013.01); *E06B 9/24* (2013.01); *G02F 1/1397* (2013.01); *G02F 1/13475* (2013.01); *G02F 1/13725* (2013.01); *G02F 1/13737* (2013.01); *G02F 1/133536* (2013.01); *G02F 1/133723* (2013.01); *G02F 1/133784* (2013.01); *C09K 2219/13* (2013.01); *E06B 2009/2464* (2013.01); *G02F 2001/133302* (2013.01); *G02F 2001/133738* (2013.01); *G02F 2202/40* (2013.01)

(56) References Cited

U.S. PATENT DOCUMENTS

| | | | |
|---|---|---|---|
| 9,130,097 B2 † | 9/2015 | Taheri | |
| 9,134,551 B2 * | 9/2015 | Sukhomlinova | G02F 1/13725 |
| 2002/0085154 A1 * | 7/2002 | Hattori et al. | G02F 1/1337 349/123 |
| 2003/0161022 A1 | 8/2003 | Lazarev | |
| 2006/0147652 A1 * | 7/2006 | Liu | C09B 1/585 428/1.31 |
| 2007/0013847 A1 * | 1/2007 | Kye | G02F 1/133707 349/129 |
| 2007/0176144 A1 * | 8/2007 | Francis | C09K 19/12 252/299.01 |
| 2011/0094585 A1 * | 4/2011 | Debije | C09K 19/588 136/257 |
| 2013/0258266 A1 | 10/2013 | Sukhomlinova et al. | |
| 2014/0055740 A1 * | 2/2014 | Spaulding | G02C 7/021 351/159.02 |
| 2014/0218650 A1 * | 8/2014 | Junge | G02F 1/133528 349/20 |
| 2014/0236323 A1 * | 8/2014 | Brown | G02F 1/163 700/90 |
| 2014/0293174 A1 * | 10/2014 | Junge | G02F 1/132 349/20 |
| 2015/0299577 A1 | 10/2015 | Junge et al. | |
| 2015/0315473 A1 | 11/2015 | Junge et al. | |
| 2016/0033807 A1 | 2/2016 | Junge et al. | |

FOREIGN PATENT DOCUMENTS

| | | |
|---|---|---|
| JP | 5-289064 A | 11/1993 |
| JP | 2009046525 A1 | 3/2009 |
| WO | 2009141295 A1 | 11/2009 |
| WO | 2013020629 A1 | 2/2013 |
| WO | 2013060406 A1 | 5/2013 |
| WO | 2013-097919 A1 | 7/2013 |
| WO | 2014090367 A1 | 6/2014 |
| WO | 2014090373 A1 | 6/2014 |
| WO | 2014135240 A2 | 9/2014 |

OTHER PUBLICATIONS

Translation of Taiwanese Office Action corresponding to TW Application No. 103135879, dated Jan. 2, 2018.
English translation of Chinese Office Action issued in corresponding Chinese Patent Application No. 201480056464.2 (filed Sep. 22, 2014), dated Apr. 2, 2018—6 pages.
Search Report, issued in corresponding Chinese Patent Application No. 201480056464.2 (filed Sep. 22, 2014), dated Apr. 2, 2018—2 pages.
Office Action issued in corresponding EP Patent Application No. 14776817.0 dated May 29, 2018—6 pages.
Office Action issued in corresponding JP Patent Application No. 2016-524039 dated Sep. 11, 2018—2 pages.

\* cited by examiner
† cited by third party

DEVICE FOR REGULATING THE ENTRY OF LIGHT

The present application relates to a device for regulating the entry of light into a room, which comprises a switchable layer comprising a liquid-crystalline medium and a dichroic compound, where the liquid-crystalline medium is in a twisted nematic state in at least one switching state of the device.

For the purposes of the present invention, the term light is taken to mean, in particular, electromagnetic radiation in the UV-A, VIS and NIR region. In particular, it is taken to mean light of a wavelength which is only absorbed to a negligible extent or not at all by the materials usually used in windows (for example glass). According to the definitions usually used, the UV-A region is taken to mean a wavelength of 320 to 380 nm, the VIS region is taken to mean a wavelength of 380 nm to 780 nm and the NIR region is taken to mean a wavelength of 780 nm to 2000 nm.

For the purposes of the present application, the term liquid-crystalline medium is taken to mean a material which has liquid-crystalline properties under certain conditions. The liquid-crystalline medium in accordance with the invention typically comprises at least one compound whose molecules have an elongate shape, i.e. are significantly longer in one spatial direction (longitudinal axis) than in the other two spatial directions.

For the purposes of the present application, a dichroic compound is taken to mean a light-absorbent compound in which the absorption properties are dependent on the orientation of the compound relative to the direction of polarisation of the light. A dichroic compound in accordance with the present application typically has an elongate shape, i.e. the compound is significantly longer in one spatial direction (longitudinal axis) than in the other two spatial directions.

A twisted nematic state is taken to mean a state in which the orientation axes of the molecules of the liquid-crystalline medium are in each case parallel to one another within a plane which is parallel to the plane of the switchable layer, but are twisted by a certain angle relative to the orientation axes of the molecules of adjacent planes. The relative twist of the orientation axis in one plane relative to the orientation axis in another plane is proportional to the separation of the planes from one another on an axis parallel to the switchable layer, so that the orientation axes describe a helix with a helix axis perpendicular to the plane of the switchable layer. FIG. 2 of the drawings, which is explained in greater detail in the following sections, illustrates the twisted nematic state.

In the area of devices for regulating the entry of light into rooms (switchable windows, smart windows), a number of different technical solutions have been proposed in the past.

One possible solution is the use of a switchable layer comprising a liquid-crystalline medium in the untwisted nematic state in a mixture with one or more dichroic compounds. By application of a voltage, a change in the spatial orientation of the molecules of the dichroic compound can be achieved in these switchable layers, causing a change in the transmission through the switchable layer. A corresponding device is described, for example, in WO 2009/141295. Alternatively, a change in transmission of this type can also be achieved without electrical voltage by a temperature-induced transition from an isotropic state of the liquid-crystalline medium to a liquid-crystalline state, as described, for example, in US 2010/0259698.

It is of interest in this connection to provide devices for regulating the entry of light into a room which have the greatest possible energy regulation capability, i.e. have the greatest possible difference in their light transmittance on switching. The difference is also called the switching range or range. The greatest possible switching range enables the devices effectively to regulate the input of energy into a room and thus, for example, the temperature of this room. It is furthermore of interest that the devices have the simplest possible design, in particular have the fewest possible layers. Still furthermore, the devices should require the lowest possible electrical voltage for the switching operation, i.e. should operate energy-efficiently. Still furthermore, the devices should contain the smallest possible amounts of liquid-crystalline medium.

In the course of the present invention, it has now been found that the above-mentioned technical objects can be achieved by the provision of a device for regulating the entry of light which has a novel structure and contains a twisted nematic liquid-crystalline medium. Unexpectedly, a device of this type has a significantly greater switching range compared with devices containing untwisted nematic liquid-crystalline medium in the switchable layer.

The invention therefore relates to a device for regulating the entry of light into a room, comprising a switchable layer S comprising a liquid-crystalline medium which comprises at least one dichroic compound, where the following applies to the thickness d of layer S and the optical anisotropy Δn of the liquid-crystalline medium of layer S:

$$d < 2\ \mu m/\Delta n$$

and where the molecules of the liquid-crystalline medium of layer S are in a twisted nematic state in the switching state of the device without an applied electrical voltage or in the switching state of the device with an applied electrical voltage.

The optical anisotropy here is determined at 20° C. and 589 nm as indicated in "Merck Liquid Crystals, Physical Properties of Liquid Crystals", Status November 1997, Merck KGaA, Germany.

The following preferably applies to the thickness d of layer S and the optical anisotropy Δn of the liquid-crystalline medium of layer S:

$$d < 1\ \mu m/\Delta n.$$

The following particularly preferably applies:

$$d < 0.9\ \mu m/\Delta n\ \text{and}\ d > 0.2\ \mu m/\Delta n.$$

The device preferably comprises one or more, particularly preferably two, orientation layers, which are arranged directly adjacent to the switchable layer S. It is preferred in accordance with the invention for precisely one orientation layer, called O1, to be adjacent to one side of the switchable layer S, and precisely one other orientation layer, called O2, to be adjacent to the opposite side of the switchable layer S.

The orientation layers preferably effect a homogeneous arrangement of the molecules of the liquid-crystalline medium of layer S adjacent to the orientation layer. According to an alternative embodiment of the invention, however, they may also be designed in such a way that they effect a perpendicular arrangement of the molecules of the liquid-crystalline medium of layer S adjacent to the orientation layer.

Furthermore, the orientation layers preferably effect an alignment of the molecules of the liquid-crystalline medium of layer S at the interface to the respective orientation layer along the rubbing direction of the orientation layer. It is preferred for orientation layers O1 and O2 to be designed in such a way that they each effect orientation axes of the molecules of the liquid-crystalline medium with different alignments in the adjacent region of layer S. This results in a twist of the molecules of the liquid-crystalline medium.

It is preferred for the rubbing directions of orientation layers O1 and O2 to include an angle of 30 to 270°, particularly preferably an angle of 100° to 260°, very particularly preferably an angle of 160 to 255°, and most preferably an angle of 230 to 250°.

The orientation layers are preferably polyimide layers. The orientation layers particularly preferably have rubbed polyimide on their surface adjacent to layer S. Polyimide rubbed in a certain way known to the person skilled in the art results in a preferential alignment of the compounds of the liquid-crystalline medium in the rubbing direction if the compounds are planar to the orientation layer. Furthermore, polymers obtained by an exposure operation with polarised light can be used as orientation layer for achieving a preferential direction of the compounds of the liquid-crystalline medium (photoalignment).

For orientation layers which are intended to effect a perpendicular arrangement of the molecules of the liquid-crystalline medium, corresponding embodiments are known to the person skilled in the art.

It is furthermore preferred, in the case of homogeneous alignment in the state without an applied voltage, for the molecules of the liquid-crystalline medium not to be completely planar to the orientation layer, but instead to have a slight pretilt angle. In the case of homogeneous alignment in the state without an applied voltage, the orientation axes of the molecules of the liquid-crystalline medium of layer S preferably include an angle of 1° to 10° with the plane of orientation layer O1 or O2, particularly preferably an angle of 2° to 9°, and very particularly preferably an angle of 3° to 8°. This can be achieved by suitable design of the orientation layer. Methods for this purpose are known to the person skilled in the art, for example through a suitable choice of the curing times and curing temperatures for commercially available polyimide starting materials in accordance with empirical methods and/or manufacturer information. The choice of a pretilt angle in the preferred range enables achievement of a particularly homogeneous appearance of the device when looked through, and optical interferences are avoided.

For the alternative case of homeotropic alignment of the molecules of the liquid-crystalline medium in the state without an applied voltage, it is preferred for the orientation axes of the molecules not to be completely perpendicular to the plane of orientation layer O1 or O2, but instead to include an angle slightly different from 90° therewith. The angle included in this case by the orientation axes with the plane of orientation layer O1 or O2 is preferably 89° to 80°, particularly preferably 88° to 81° and very particularly preferably 87° to 82°.

Furthermore preferably, layer S in the device according to the invention is arranged between two substrate layers or is surrounded thereby. The substrate layers can consist, for example, of glass or a polymer, in particular of glass, PET, PEN, PVB or PMMA.

The device is preferably characterised in that it does not comprise a polymer-based polariser, particularly preferably does not comprise a polariser in solid material phase and very particularly preferably does not comprise any polariser at all.

However, the device may, in accordance with an alternative embodiment, also comprise one or more polarisers. These are preferably linear polarisers. If one or more polarisers are present, these are preferably arranged parallel to layer S.

If precisely one polariser is present, its absorption direction is preferably perpendicular to the preferential alignment of the liquid-crystalline compounds of the liquid-crystalline medium of the device according to the invention on the side of layer S on which the polariser is located.

In the device according to the invention, both absorptive and also reflective polarisers can be employed. Preference is given to the use of polarisers which are in the form of thin optical films. Examples of reflective polarisers which can be used in the device according to the invention are DRPF (diffusive reflective polariser film, 3M), DBEF (dual brightness enhanced film, 3M), DBR (layered-polymer distributed Bragg reflectors, as described in U.S. Pat. Nos. 7,038,745 and 6,099,758) and APF films (advanced polariser film, 3M, cf. Technical Digest SID 2006, 45.1, US 2011/0043732 and U.S. Pat. No. 7,023,602). It is furthermore possible to employ polarisers based on wire grids (WGPs, wire-grid polarisers) which reflect infrared light or VIS light. Examples of absorptive polarisers which can be employed in the devices according to the invention are the Itos XP38 polariser film and the Nitto Denko GU-1220DUN polariser film. An example of a circular polariser which can be used in accordance with the invention is the APNCP37-035-STD polariser (American Polarizers). A further example is the CP42 polariser (ITOS).

It is preferred for the device according to the invention to have precisely one switchable layer.

Layer S preferably has a thickness of 2 to 12 μm, particularly preferably 3 to 10 μm and very particularly preferably 4 to 8 μm. This effects a particularly large range of the light transmission.

Layer S preferably has a light transmittance of the bright state $\tau_{v\ bright}$, calculated in accordance with European Standard EN410, equation (1), of at least 30%, preferably at least 35%, particularly preferably at least 40% and very particularly preferably at least 50%. The light transmittance of the bright state $\tau_{v\ bright}$ of the switchable layer is indicated in percent. It is calculated from the ratio of the light transmittance of the switchable layer in the bright state of the device based on a device having a switchable layer without dye as reference. It is determined in accordance with European Standard EN410, equation (1) (determination of luminous and solar characteristics of glazing) from the spectral transmittances, taking into account the relative spectral distribution of the standard illuminant and the spectral response factor of the standard observer.

The device is preferably characterised in that layer S comprises at least two different dichroic compounds, preferably precisely 2, 3, 4, 5 or 6 different dichroic compounds, particularly preferably precisely 2, 3 or 4 different dichroic compounds.

It is furthermore preferred for at least one of the dichroic compounds to be luminescent, preferably fluorescent.

Fluorescence here is taken to mean that a compound is placed in an electronically excited state by absorption of light having a certain wavelength, where the compound is subsequently converted into the ground state with emission of light. The emitted light preferably has a longer wavelength than the absorbed light. The transition from the excited state to the ground state is furthermore preferably spin-allowed, i.e. takes place without a change in the spin. The lifetime of the excited state of the fluorescent compound is furthermore preferably shorter than $10^{-5}$ s, particularly preferably shorter than $10^{-6}$ s, very particularly preferably between $10^{-9}$ and $10^{-7}$ s.

The absorption spectra of the dichroic compounds in the liquid-crystalline medium preferably complement one another in such a way that the impression of a black colour of the device arises for the eye. The device is particularly preferably colourless in all its switching states when looked through, where a grey or black impression is likewise regarded as colourless.

The two or more dichroic compounds of the liquid-crystalline medium preferably cover a large part of the visible spectrum. This is preferably achieved through at least one dichroic compound absorbing red light, at least one absorbing green to yellow light and at least one absorbing blue light.

The precise way in which a mixture of dichroic compounds which appears black or grey to the eye can be prepared is known to the person skilled in the art and is described, for example, in Manfred Richter, Einführung in die Farbmetrik [Introduction to Colorimetry], 2nd Edition, 1981, ISBN 3-11-008209-8, Verlag Walter de Gruyter & Co.

The dichroic compounds furthermore preferably absorb predominantly light in the UV-VIS-NIR region, i.e. in a wavelength range from 320 to 2000 nm. UV light, VIS light and NIR light here are as defined above. The dichroic compounds particularly preferably have absorption maxima in the range from 400 to 1300 nm.

The proportion of all dichroic compounds together in the liquid-crystalline medium is preferably in total 0.01 to 10% by weight, particularly preferably 0.1 to 7% by weight and very particularly preferably 0.2 to 7% by weight. The proportion of an individual dichroic compound is preferably 0.01 to 10% by weight, preferably 0.05 to 7% by weight and very particularly preferably 0.1 to 7% by weight.

The precisely preferred proportion of the dichroic compounds in the liquid-crystalline medium is dependent on the thickness of layer S. The product of the proportion of the dichroic compounds in the liquid-crystalline layer and the thickness of the layer is particularly preferably between 8 and 40% by weight*μm, particularly preferably between 10 and 35% by weight*μm.

The dichroic compounds are furthermore preferably selected from the compound classes indicated in B. Bahadur, Liquid Crystals—Applications and Uses, Vol. 3, 1992, World Scientific Publishing, Section 11.2.1, and particularly preferably from the explicit compounds given in the table present therein.

Preferably at least one dichroic compound, particularly preferably all dichroic compounds, are selected from azo compounds, anthraquinones, methine compounds, azomethine compounds, merocyanine compounds, naphthoquinones, tetrazines, perylenes, terrylenes, quaterrylenes, higher rylenes, squaraines, benzothiadiazoles, diketopyrrolopyrroles and pyrromethenes.

Anthraquinone dyes are described, for example, in EP 34832, EP 44893, EP 48583, EP 54217, EP 56492, EP 59036, GB 2065158, GB 2065695, GB 2081736, GB 2082196, GB 2094822, GB 2094825, JP-A 55-123673, DE 3017877, DE 3040102, DE 3115147, DE 3115762, DE 3150803 and DE 3201120, naphthoquinone dyes are described, for example, in DE 3126108 and DE 3202761, azo dyes in EP 43904, DE 3123519, WO 82/2054, GB 2079770, JP-A 56-57850, JP-A 56-104984, U.S. Pat. Nos. 4,308,161, 4,308,162, 4,340,973, T. Uchida, C. Shishido, H. Seki and M. Wada: Mol. Cryst. Liq. Cryst. 39, 39-52 (1977), and H. Seki, C. Shishido, S. Yasui and T. Uchida: Jpn. J. Appl. Phys. 21, 191-192 (1982), and perylenes in EP 60895, EP 68427 and WO 82/1191.

Very particular preference is given to benzothiadiazole dyes, as disclosed, for example, in JP 2008/268762, JP 2003/104976, WO2004002970, X. Zhang et al., J. Mater. Chem. 2004, 14, 1901-1904, X. Zhang et al., J. Mater. Chem., 2006, 16, 736-740, and X. Li et al., Org. Lett. 2008, 10, 17, 3785-3787, and in the as yet unpublished application EP 13002711.3. Very particular preference is furthermore given to rylene dyes, as disclosed, for example, in EP 2166040, US 2011/0042651, EP 68427, EP 47027, EP 60895, DE 3110960 and EP 698649. Very particular preference is furthermore given to diketopyrrolopyrroles, as disclosed, for example, in the as yet unpublished application EP 13005918.1.

According to a preferred embodiment, the liquid-crystalline medium comprises exclusively dichroic compounds selected from the classes of the benzothiadiazole dyes, azo dyes, diketopyrrolopyrrole dyes and rylene dyes.

Examples of preferred dichroic compounds which may be present in the liquid-crystalline medium are depicted in the following table:

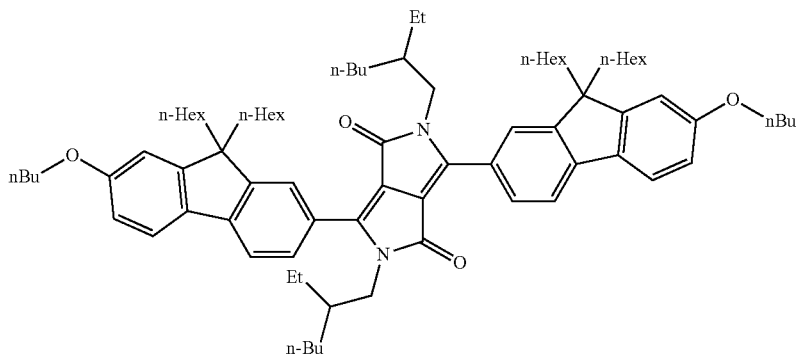

-continued
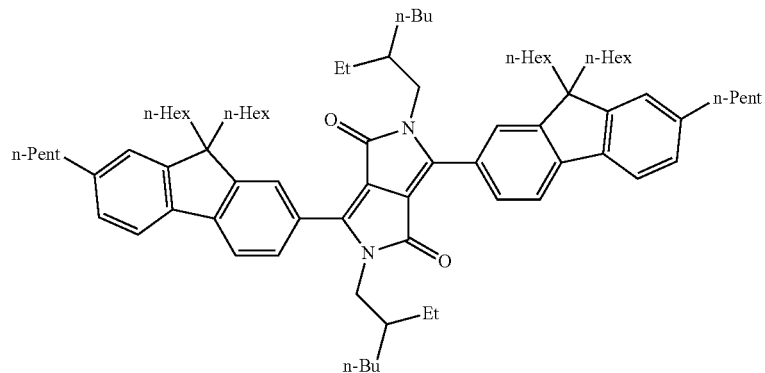
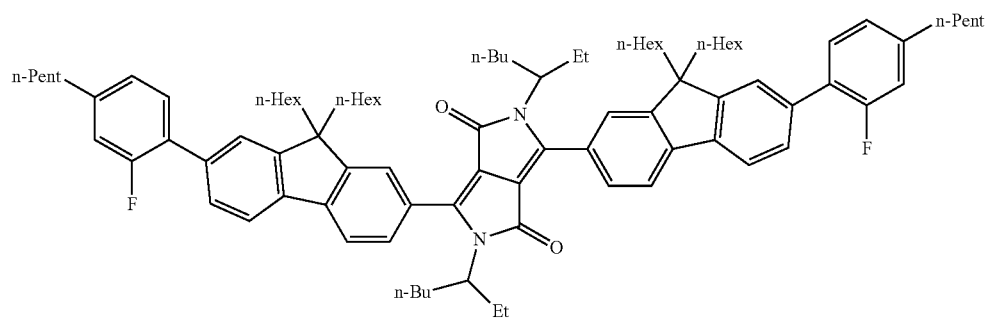
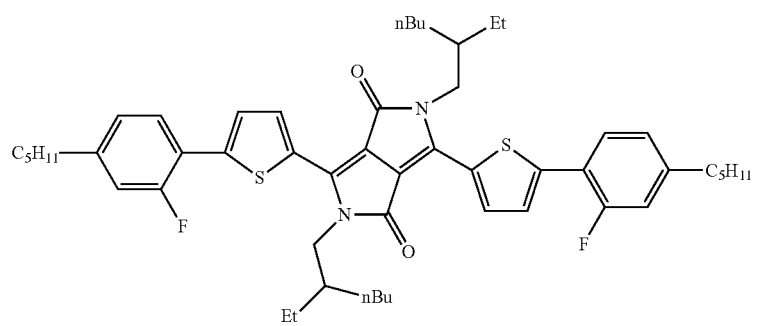
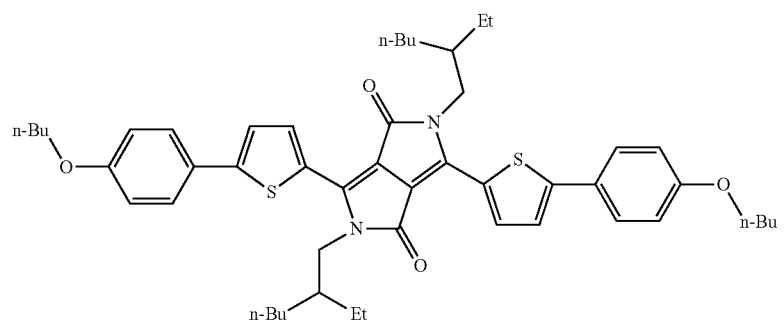

-continued
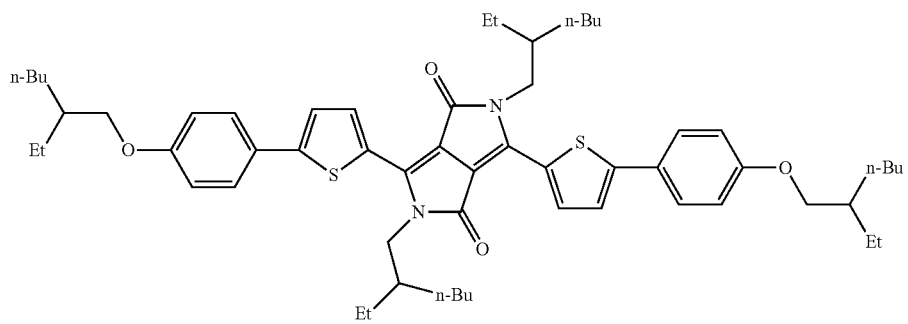
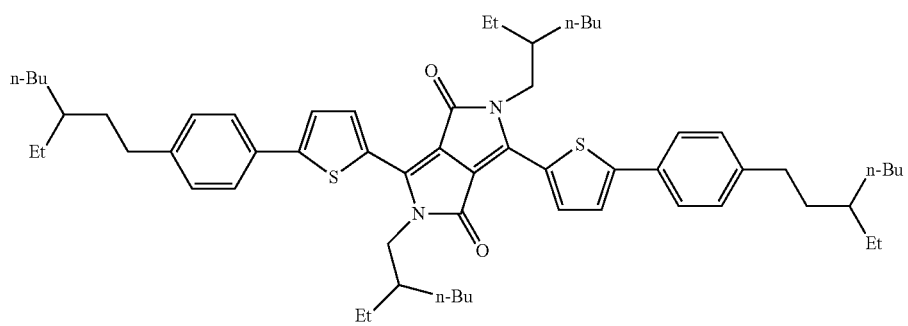
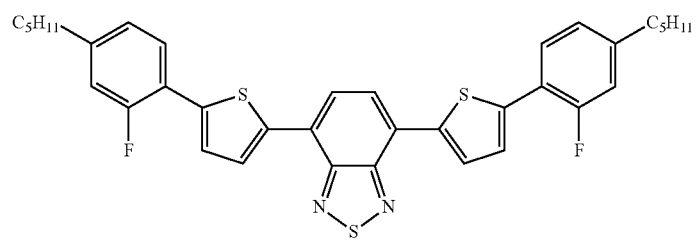
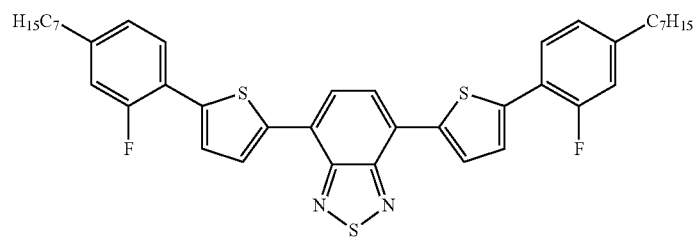
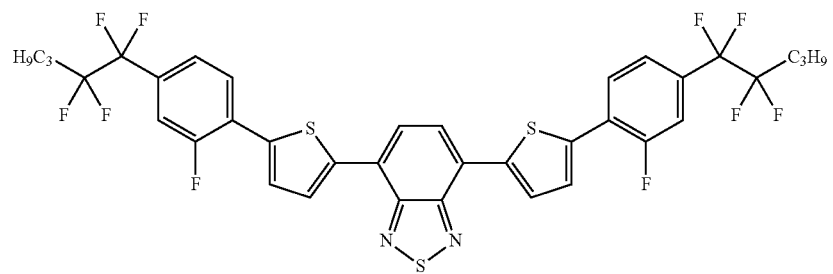

-continued
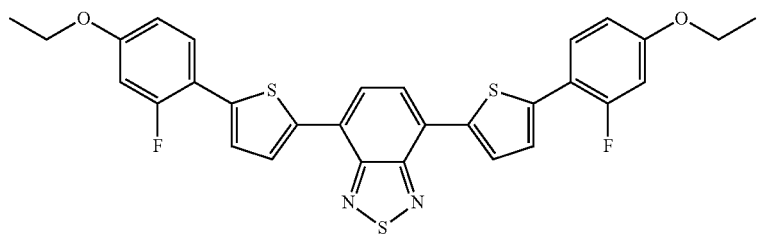 [SMILES: CCOc1ccc(-c2ccc(-c3ccc(-c4ccc(-c5ccc(OCC)cc5F)s4)c4nsnc34)s2)c(F)c1]
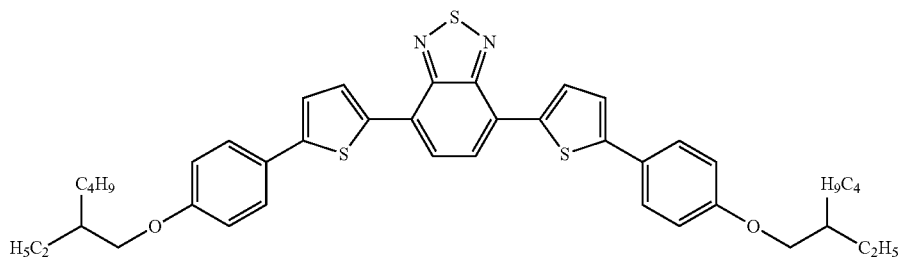
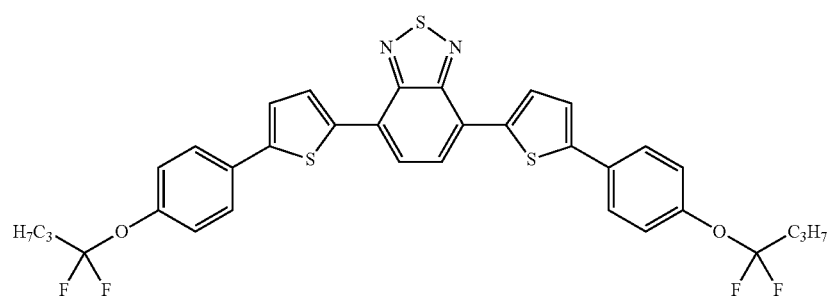
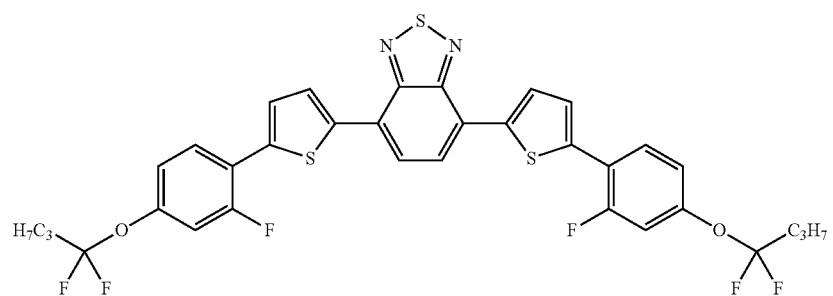
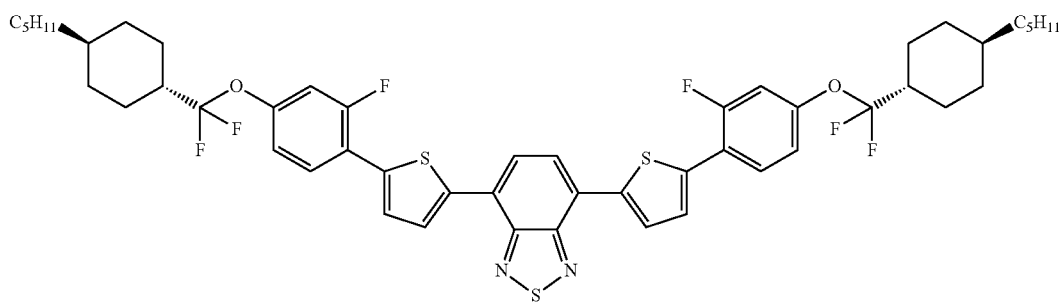

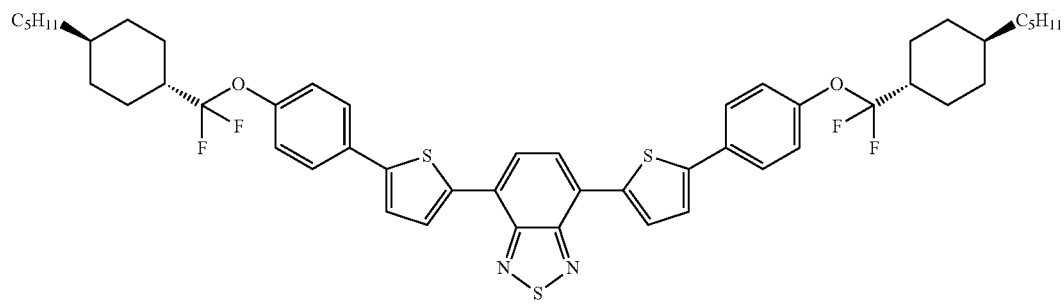
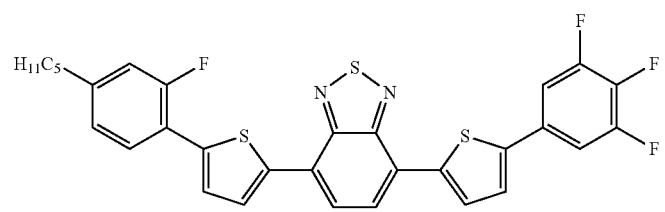
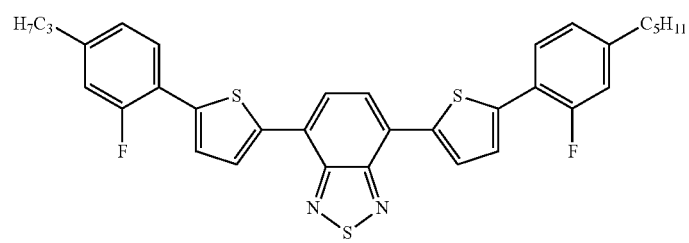
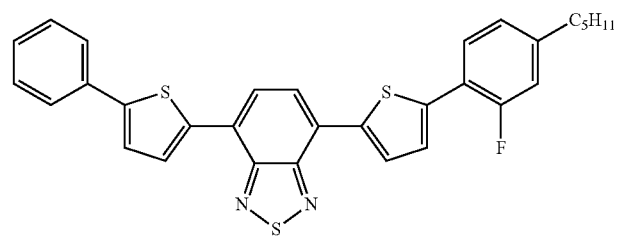
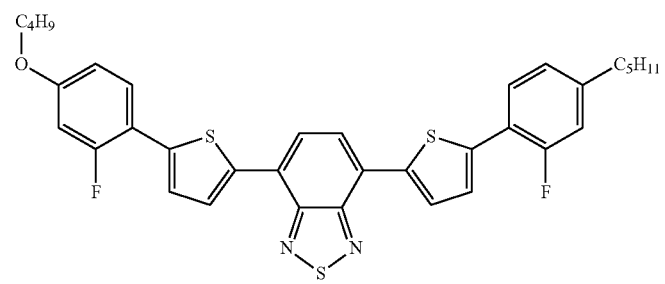
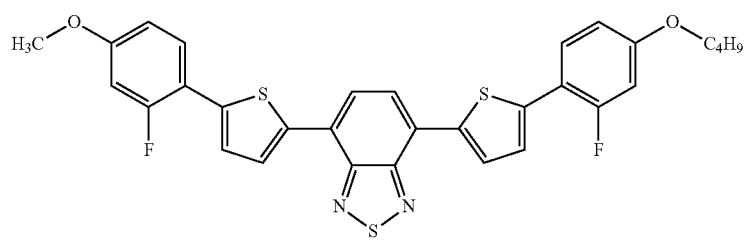

-continued
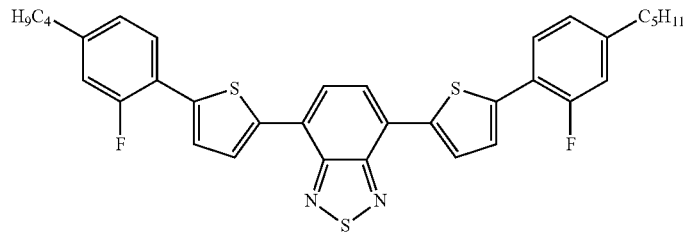
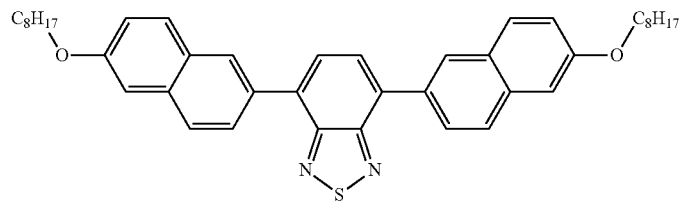
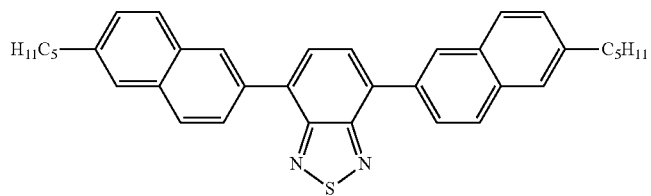
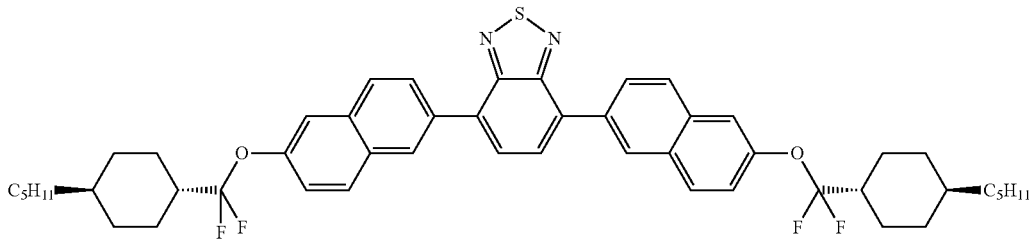
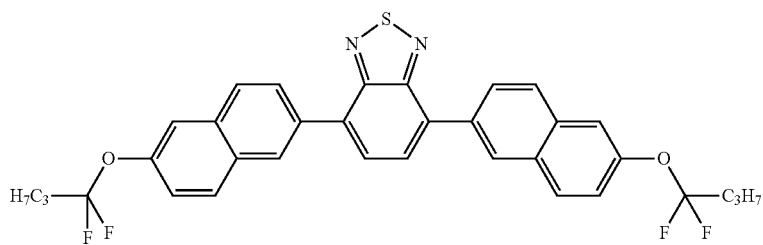
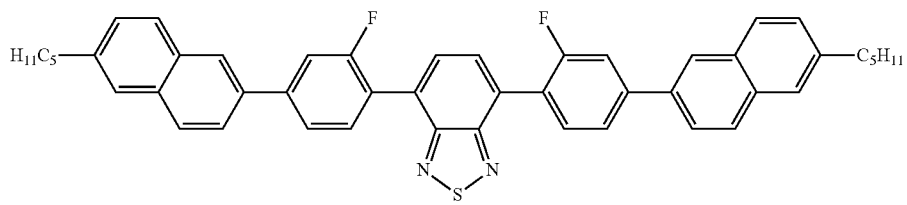
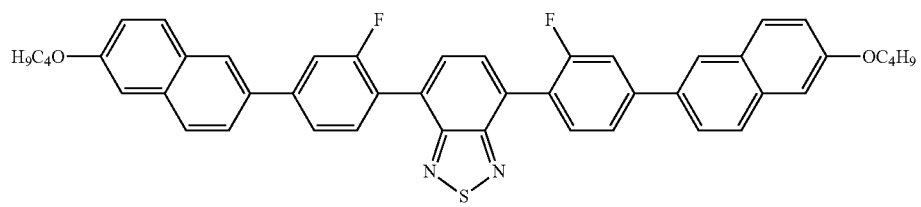

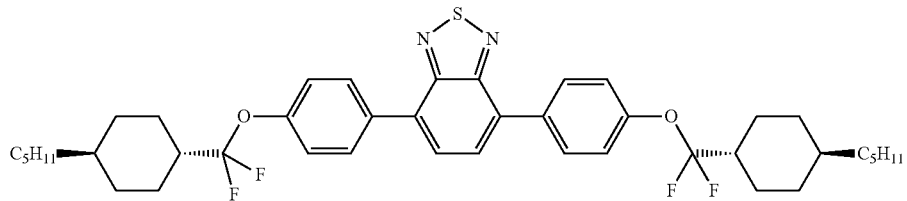
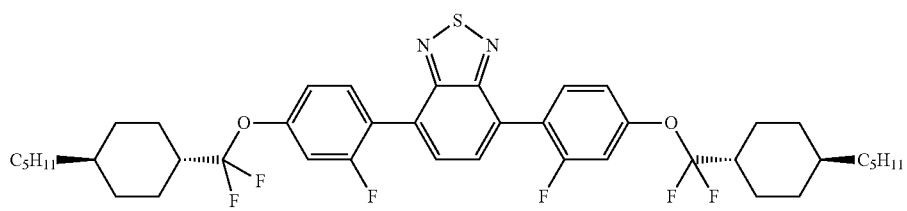
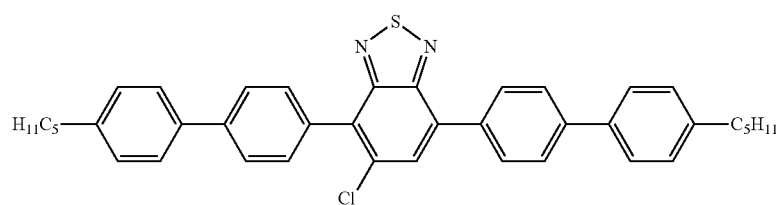
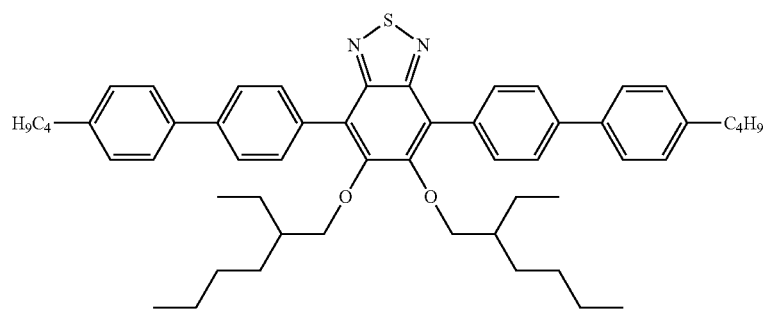
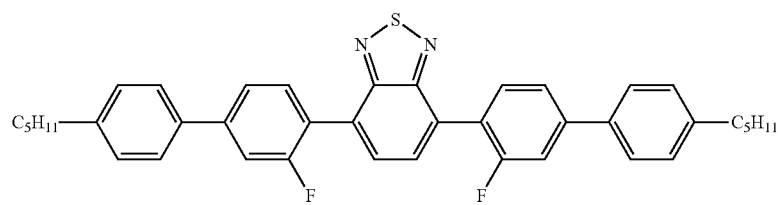
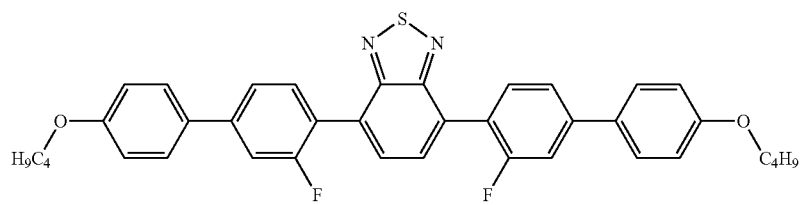

-continued
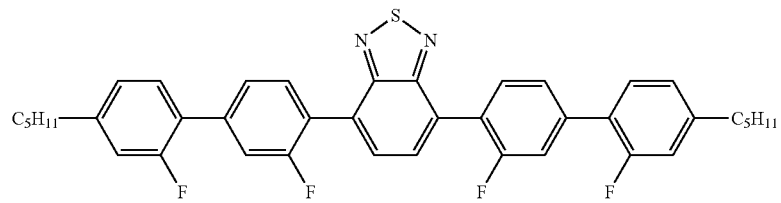
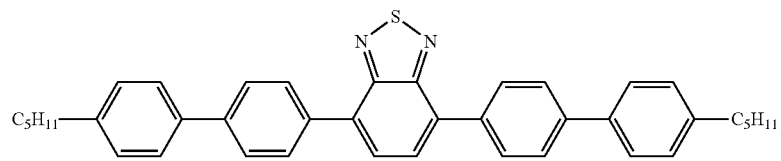
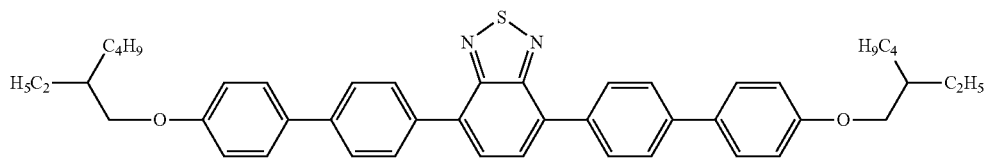
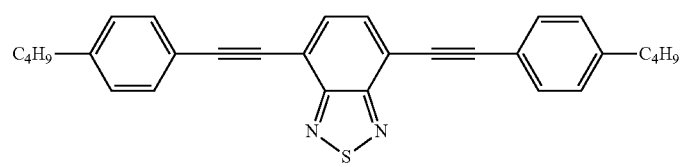
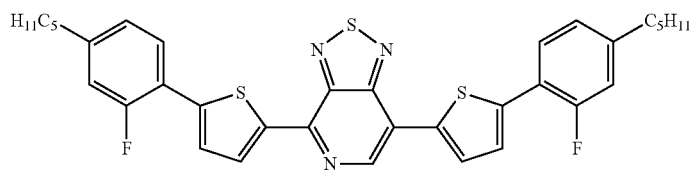
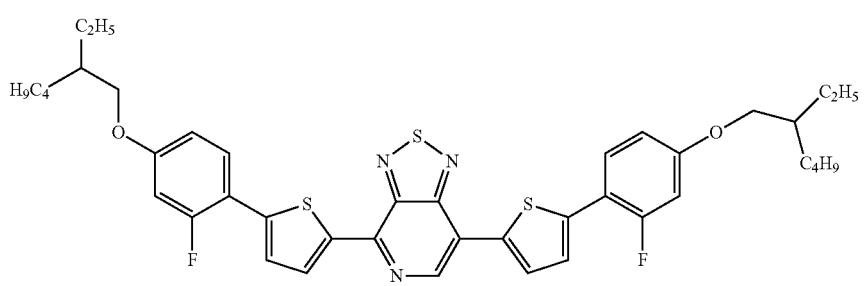
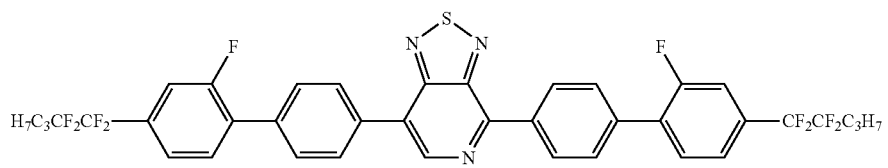
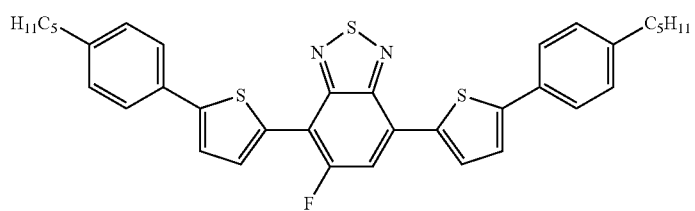

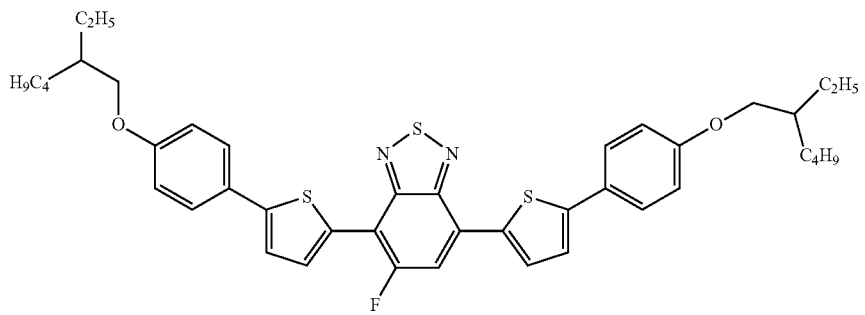
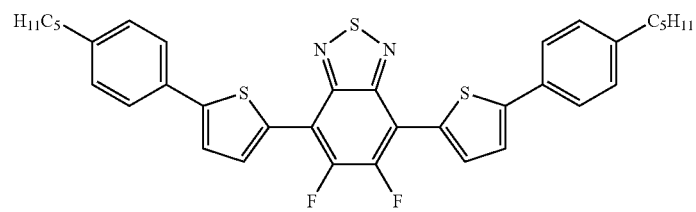
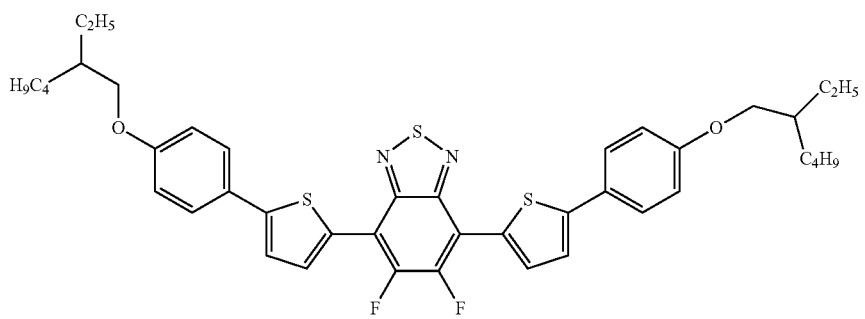
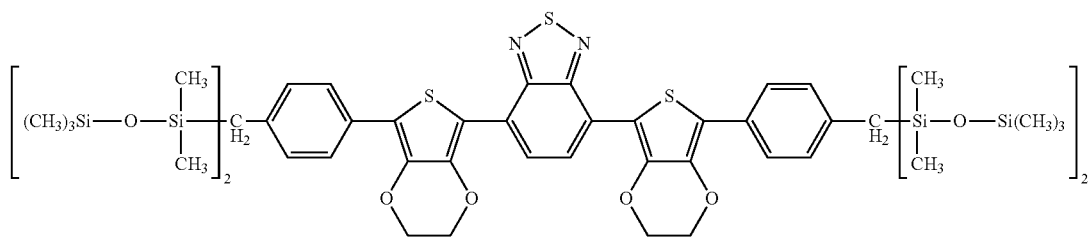
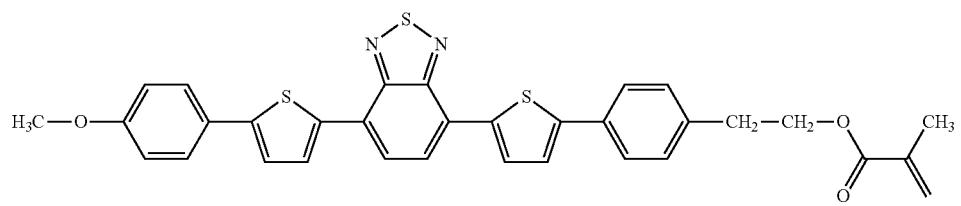 [SMILES: C=C(C)C(=O)OCCc1ccc(-c2ccc(-c3ccc(-c4ccc(-c5ccc(OC)cc5)s4)c4nsnc34)s2)cc1]
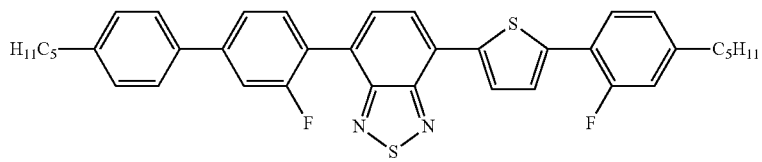

-continued
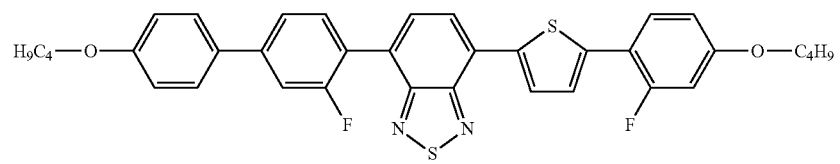
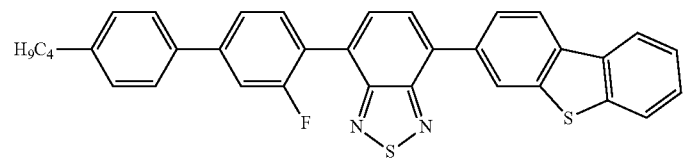
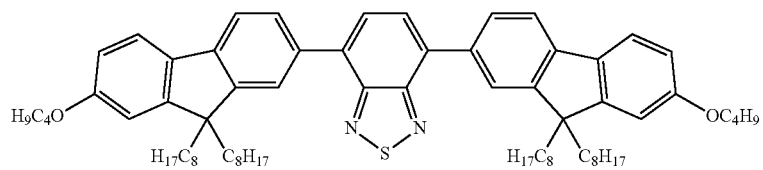
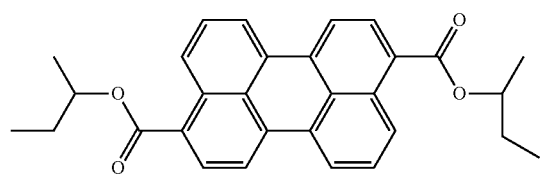 [SMILES: CCC(C)OC(=O)c1ccc2c3cccc4c(C(=O)OC(C)CC)ccc(c5cccc1c52)c43]
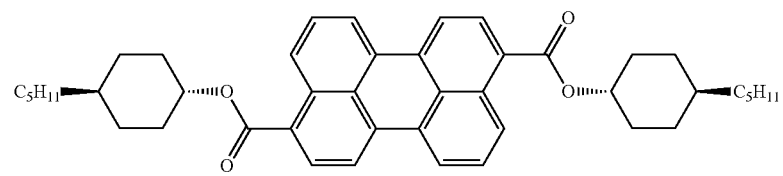
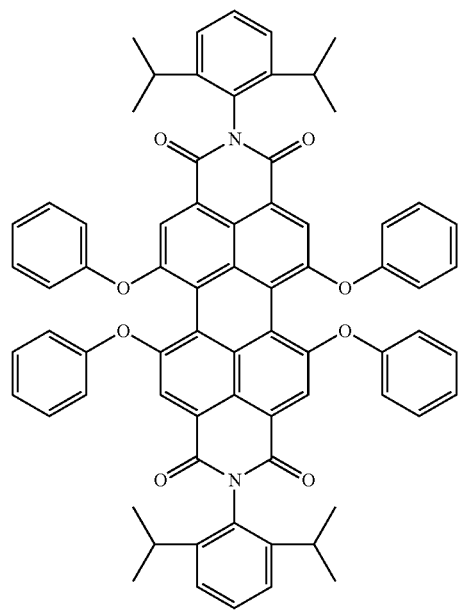 [SMILES: CC(C)c1cccc(C(C)C)c1N1C(=O)c2cc(Oc3ccccc3)c3c4c(Oc5ccccc5)cc5c6c(cc(Oc7ccccc7)c(c7c(Oc8ccccc8)cc(c2c37)C1=O)c64)C(=O)N(c1c(C(C)C)cccc1C(C)C)C5=O]

-continued
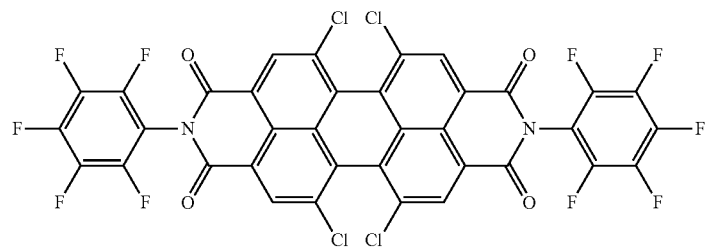 [SMILES: O=C1c2cc(Cl)c3c4c(Cl)cc5c6c(cc(Cl)c(c7c(Cl)cc(c2c37)C(=O)N1c1c(F)c(F)c(F)c(F)c1F)c64)C(=O)N(c1c(F)c(F)c(F)c(F)c1F)C5=O]
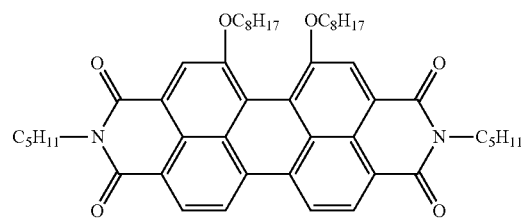
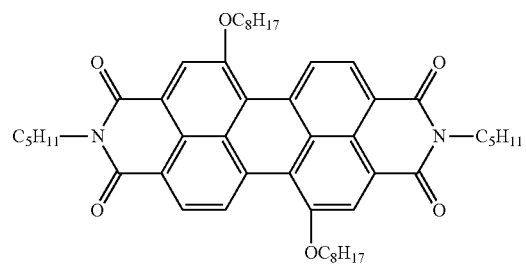
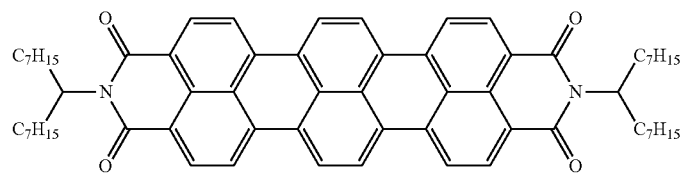
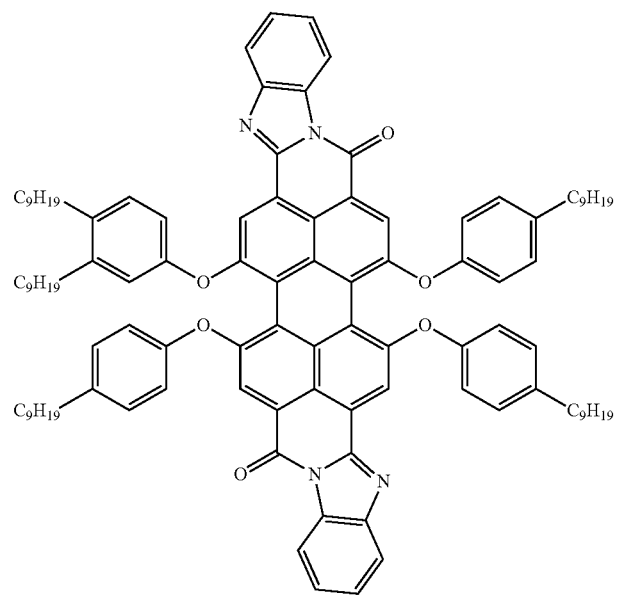

-continued
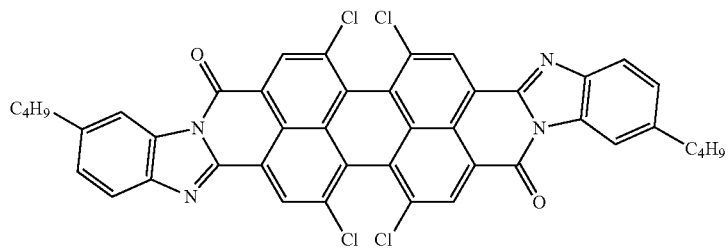
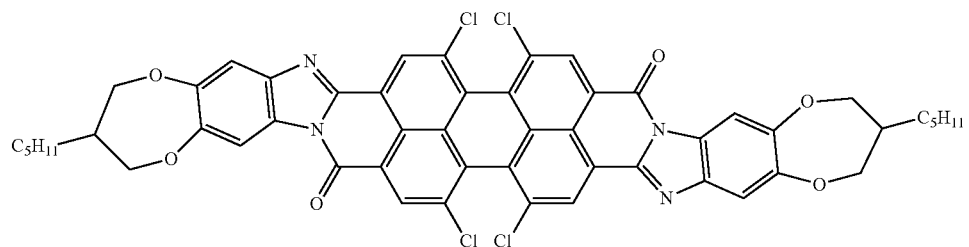
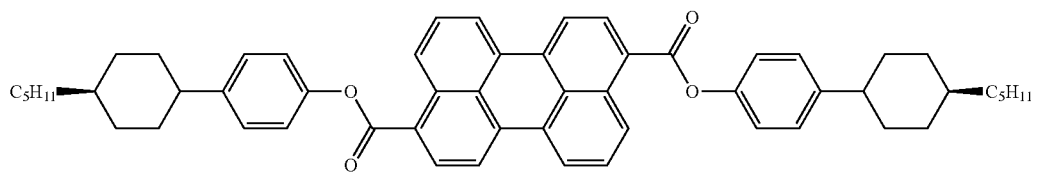
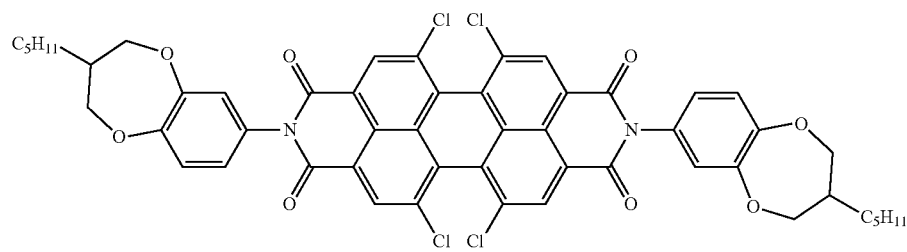
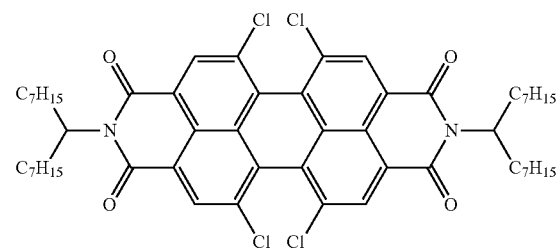
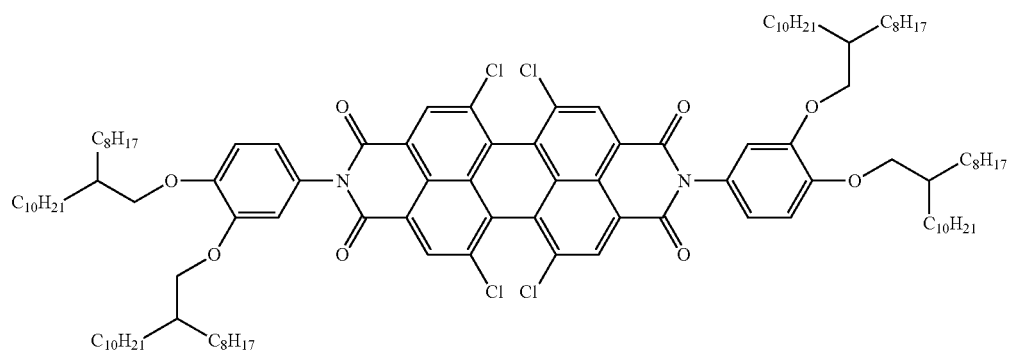

-continued
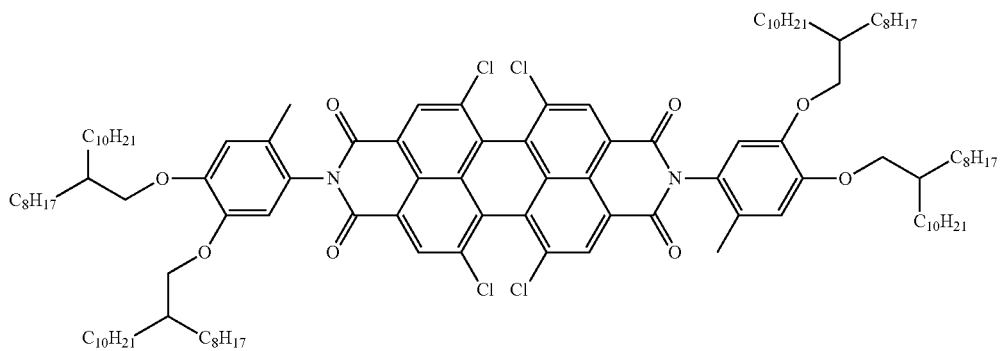
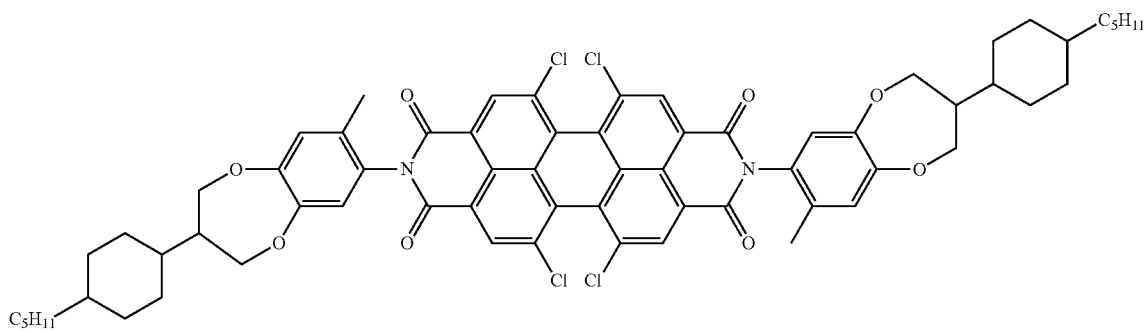
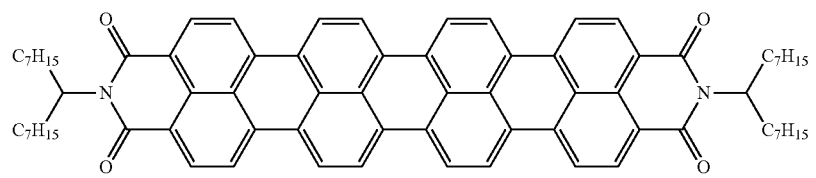
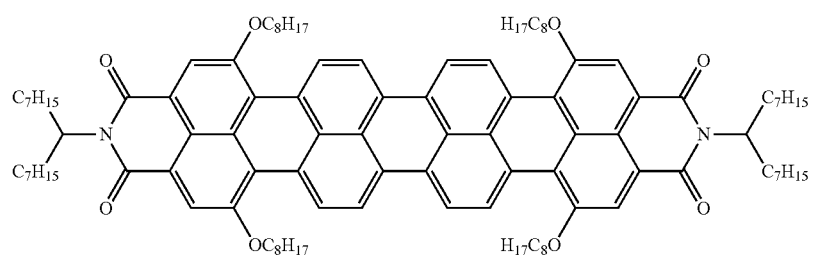
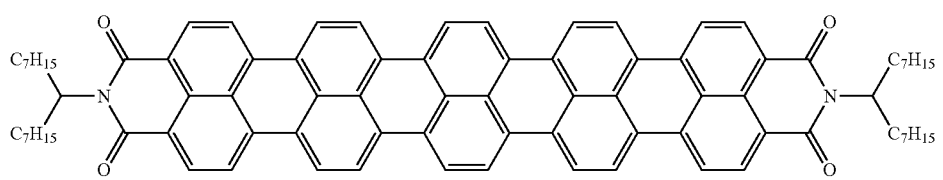
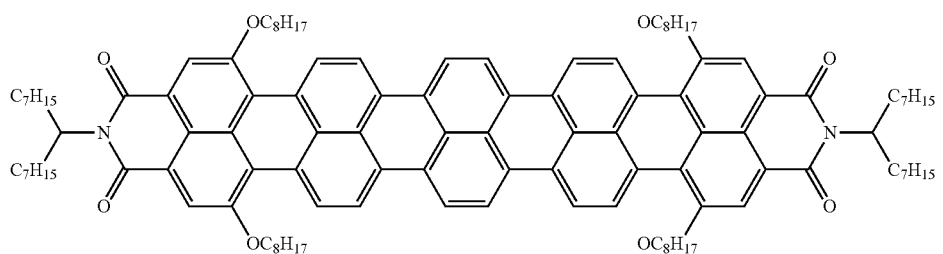

-continued
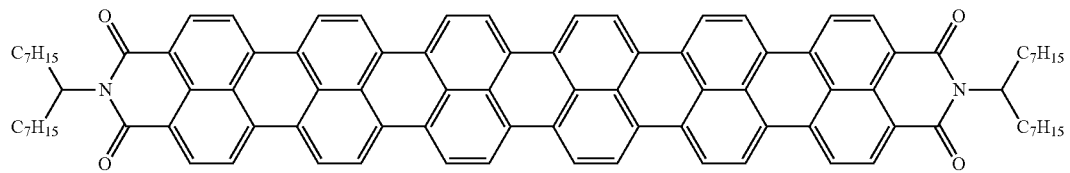
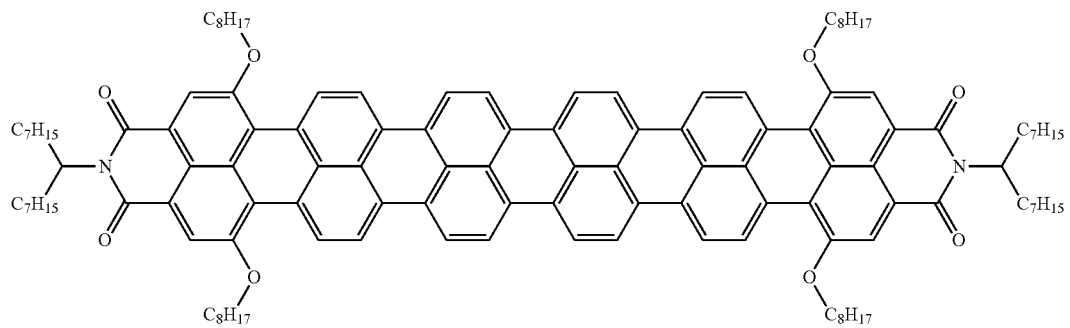
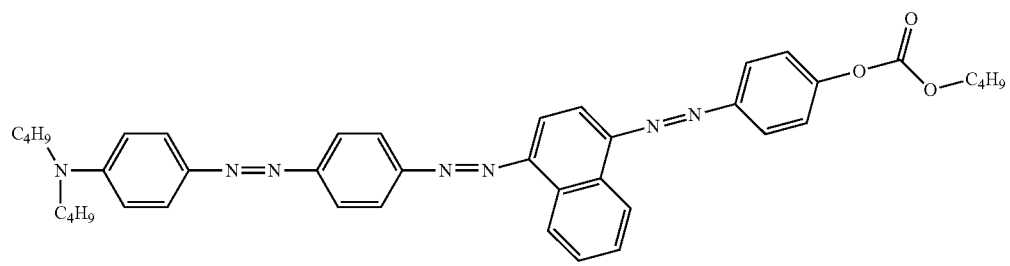
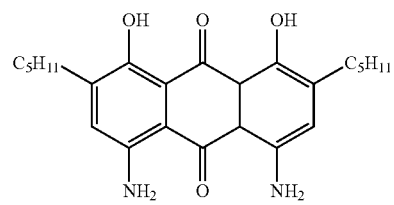
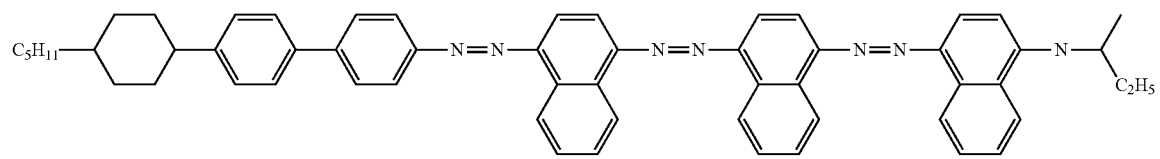
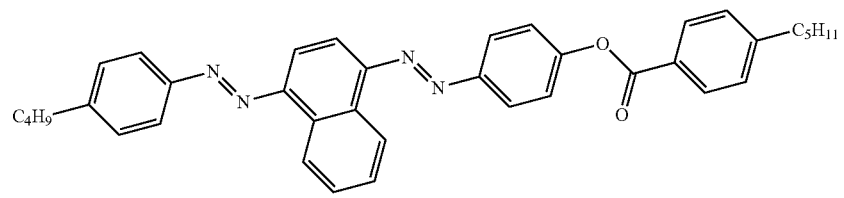

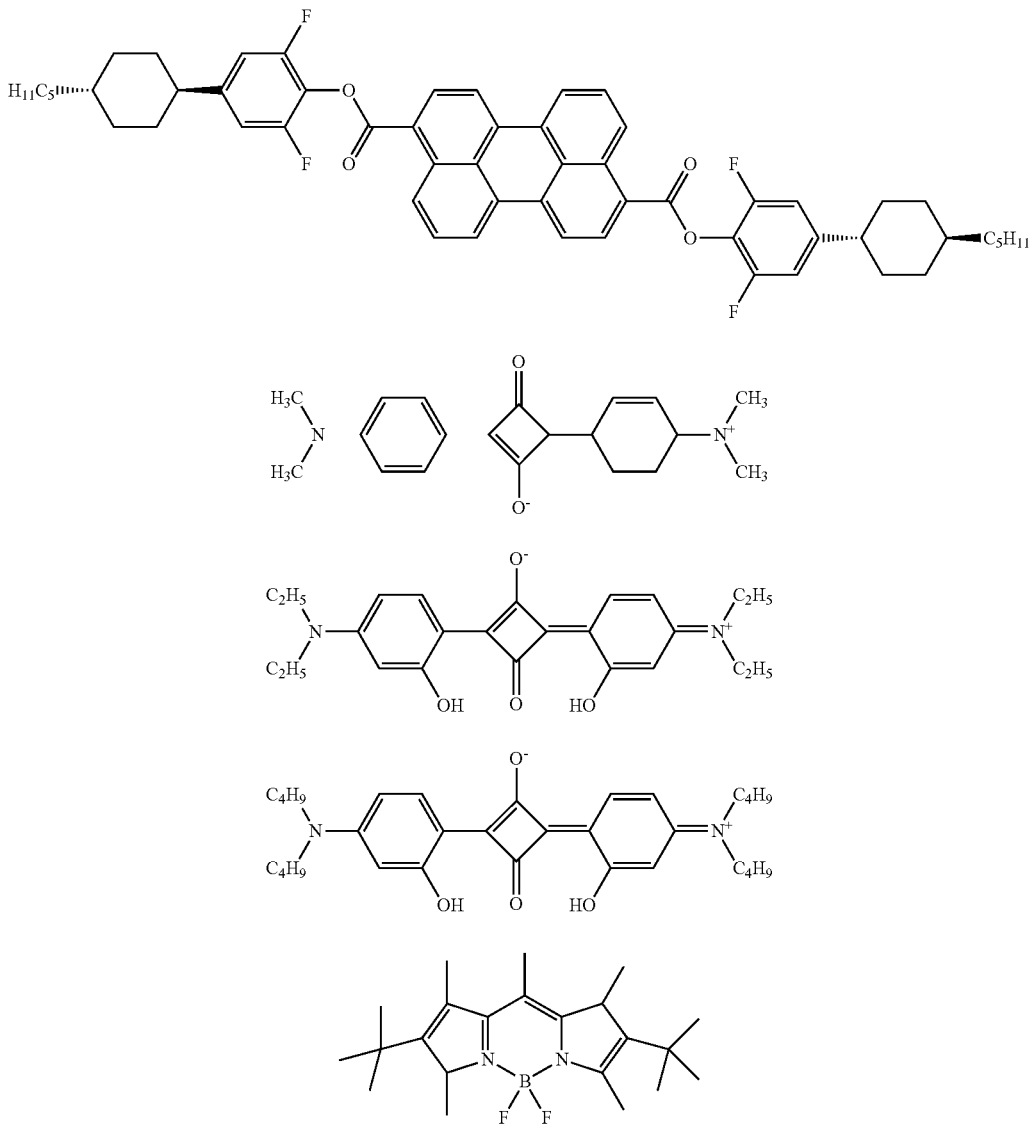

The switchable layer S of the device comprises a liquid-crystalline medium.

The liquid-crystalline medium is preferably nematically liquid-crystalline at the operating temperature of the device. It is particularly preferably nematically liquid-crystalline in a range of +−20° C., very particularly preferably in a range of +−30° C. above and below the operating temperature of the device.

In accordance with the invention, the molecules of the liquid-crystalline medium are in a twisted nematic state either in the switching state of the device without an applied voltage or in the switching state of the device with an applied voltage. The molecules in this state are furthermore preferably in a homogeneous arrangement.

The molecules of the liquid-crystalline medium are preferably in a twisted nematic state and in a homogeneous alignment in the switching state of the device without an applied voltage. In this case, it is furthermore preferred for the molecules of the liquid-crystalline medium to be in an untwisted nematic state and in a homeotropic alignment in the state with an applied voltage.

According to an alternative embodiment, the molecules of the liquid-crystalline medium are in an untwisted nematic state and in a homeotropic alignment in the switching state of the device without an applied voltage. In this case, it is furthermore preferred for the molecules of the liquid-crystalline medium to be in a twisted nematic state and in a homogeneous alignment in the state with an applied voltage.

The twist of the orientation axes of the molecules of the liquid-crystalline medium of layer S in the twisted nematic state, regarded over the entire layer thickness, is preferably less than one complete rotation, particularly preferably between 30 and 270°, very particularly preferably between 100° and 260°, even more preferably between 160 and 255° and most preferably between 230 and 250°.

This gives a further increased switching range, in particular if the device also has a small thickness d of switching layer S, preferably a thickness d of switching layer S which conforms to the equation $$d < 2 \ \mu m / \Delta n,$$

where Δn is the optical anisotropy of the liquid-crystalline medium of switching layer S.

An example of such a twist of the orientation axes of the molecules of the liquid-crystalline medium is shown in FIG. 2 (cf. explanation in the following section).

According to an alternative embodiment of the invention, which is preferred under certain conditions, the twist of the orientation axes of the molecules of the liquid-crystalline medium of layer S in the twisted nematic state, regarded over the entire layer thickness, is between 270° and five complete rotations (1800°), preferably between 320° and three complete rotations (1080°), particularly preferably between 340° and 740°, and very particularly preferably between 360° and 720°. Such embodiments are particularly preferred if no intermediate states between the two basic states "on" and "off" are targeted, but instead only the two basic states mentioned.

Furthermore, the liquid-crystalline medium preferably has a clearing point, preferably a phase transition from a nematically liquid-crystalline state to an isotropic state, in the temperature range from 70° C. to 170° C., preferably from 90° C. to 160° C., particularly preferably from 95° C. to 150° C. and very particularly preferably from 105° C. to 140° C.

The dielectric anisotropy Δ∈ of the liquid-crystalline medium is furthermore preferably greater than 3, particularly preferably greater than 7 and very particularly preferably greater than 8.

According to an alternative, likewise preferred embodiment, the dielectric anisotropy of the liquid-crystalline medium is less than −3, particularly preferably less than −7, and very particularly preferably less than −8.

The liquid-crystalline medium furthermore preferably comprises 3 to 30 different compounds, preferably 8 to 20, particularly preferably 10 to 18 different compounds.

The liquid-crystalline medium furthermore preferably has an optical anisotropy (Δn) of 0.01 to 0.3, particularly preferably 0.04 to 0.27.

The liquid-crystalline medium furthermore preferably has a specific electrical resistance of greater than $10^{10}$ ohm*cm.

Compounds which can be used as constituents of the liquid-crystalline medium are known to the person skilled in the art and can be selected freely.

It is furthermore preferred for the liquid-crystalline medium to comprise at least one compound which contains structural elements based on 1,4-phenylenes and 1,4-cyclohexylenes. It is particularly preferred for the liquid-crystalline medium to comprise at least one compound which contains 2, 3 or 4, particularly preferably 3 or 4 structural elements based on 1,4-phenylenes and 1,4-cyclohexylenes.

The liquid-crystalline medium may comprise one or more chiral compounds. These are then preferably present in a total concentration of 0.01 to 3% by weight, particularly preferably 0.05 to 1% by weight. In order to obtain high values for the twist, the total concentration of the chiral compounds may also be selected higher than 3% by weight, preferably up to a maximum of 10% by weight. The use of a chiral dopant in the liquid-crystalline medium enables the direction of the twist to be set in the sense of a right- or left-handed helix It is also possible to use combinations of two or more different chiral dopants. This enables the temperature stability of the device to be improved.

According to a possible embodiment of the invention, the chiral dopants are also provided with light-absorbent properties, i.e. are dyes.

The chiral compound is preferably selected so that it induces a helical pitch p of the molecules of the liquid-crystalline medium which conforms to the following equation, where d is the thickness of layer S:

$$0.1 < d/p < 0.75, \text{preferably}$$

$$0.3 < d/p < 0.65, \text{particularly preferably}$$

$$0.4 < d/p < 0.55.$$

It is particularly preferred for the value for the quotient d/p to be matched to the twist of the orientation axes of the molecules of the liquid-crystalline medium of layer S. In particular, it is preferred for a value for d/p of 0.1 to 0.7 to be selected for a twist of 180°, for a value for d/p of 0.23 to 0.73 to be selected for a twist of 220°, for a value for d/p of 0.28 to 0.78 to be selected for a twist of 240°, and for a value for d/p of 0.33 to 0.77 to be selected for a twist of 270°. A corresponding interpolation should be made for intermediate values of the twist.

Preferred chiral compounds for use in the device according to the invention are the compounds depicted in the following table:

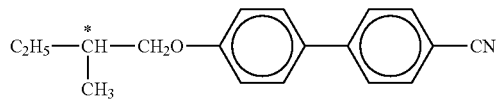

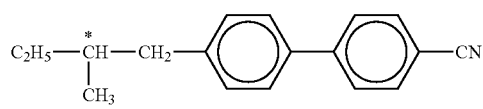

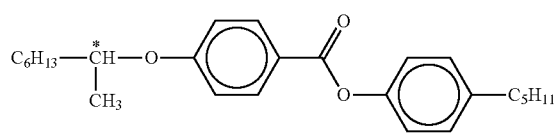

-continued
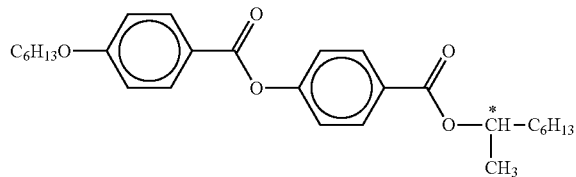
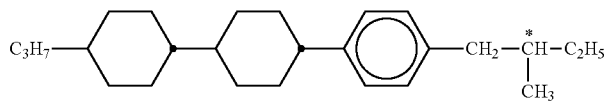
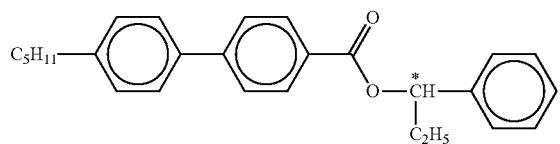
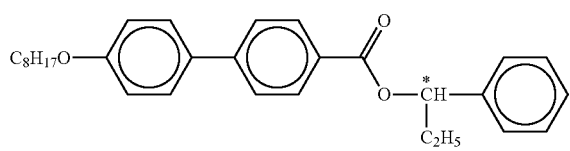
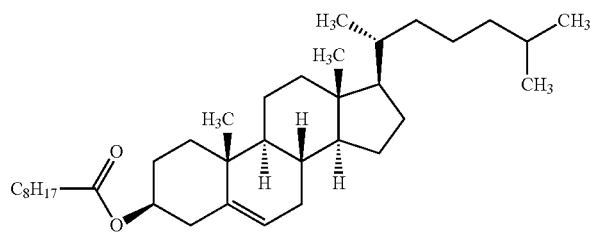
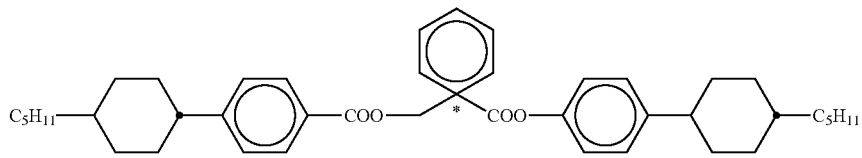
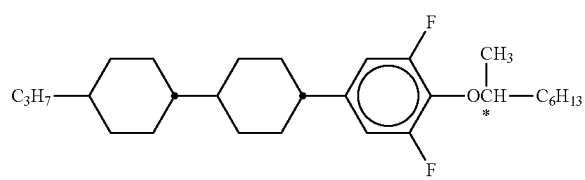
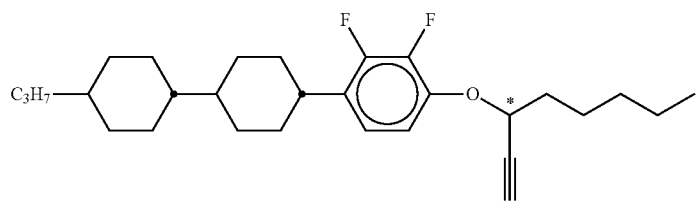

-continued

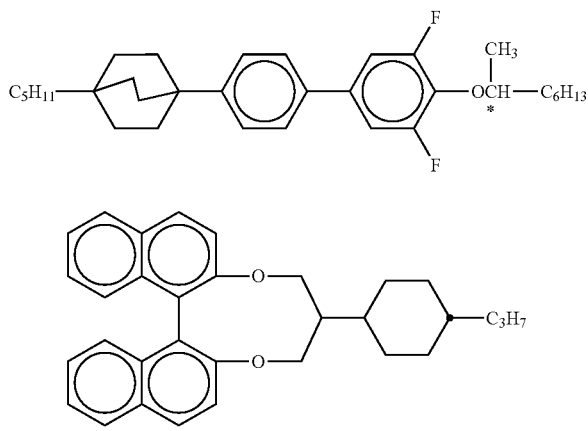

The liquid-crystalline medium preferably comprises one or more stabilisers. The total concentration of the stabilisers is preferably between 0.00001 and 10% by weight, particularly preferably between 0.0001 and 1% by weight of the entire mixture.

The device preferably has means for aligning the molecules of the liquid-crystalline medium of layer S by electrical voltage. It preferably has two or more electrodes, which are installed on both sides of layer S. The electrodes preferably consist of ITO or of a thin, preferably transparent metal and/or metal-oxide layer, for example of silver or an alternative material which is known to the person skilled in the art for this use. The electrodes are preferably provided with electrical connections. The power supply is preferably provided by a battery, a rechargeable battery, a supercapacitor or by external power supply.

The device according to the invention preferably has the following layer sequence, where the layers are preferably directly adjacent to one another (cf. also FIG. 1):

1) Substrate layer, preferably glass layer or polymer layer
2) Electrically conductive layer, preferably ITO layer
3) Orientation layer O1
4) Switchable layer S
5) Orientation layer O2
6) Electrically conductive layer, preferably ITO layer
7) Substrate layer, preferably glass layer or polymer layer.

It is not excluded here for the device to include further layers.

According to a preferred embodiment, the device according to the invention is characterised in that it generates all the energy required for switching the switching layer itself. The device is thus preferably autonomous and does not require any externally supplied energy. To this end, it preferably comprises a device for the conversion of light energy into electrical energy, particularly preferably a solar cell.

In a preferred embodiment of the invention, the device for the conversion of light energy into electrical energy is electrically connected to the means for electrical switching of the device according to the invention. The provision of the energy by the solar cell can take place directly or indirectly, i.e. via a battery or rechargeable battery or other unit for the storage of energy connected in between. The solar cell is preferably applied to the outside of the device or to the inside of the device, as disclosed, for example, in WO 2009/141295. Preference is given to the use of solar cells which are particularly efficient in the case of diffuse light, and transparent solar cells. Preference is given to the use of solar cells which are particularly efficient in the case of diffuse light, and transparent solar cells. For example, it is possible to use silicon solar cells or organic solar cells in the devices according to the invention.

The device according to the invention furthermore preferably comprises a light-guide system which conducts light from switchable layer S to a unit which converts light energy into electrical energy or heat energy.

The light-guide system is preferably constructed as described in WO 2009/141295. The light-guide system collects and concentrates light which hits the device. It preferably collects and concentrates light which is emitted by fluorescent dichroic compounds in switchable layer S comprising the liquid-crystalline medium. The light-guide system is in contact with a device for the conversion of light energy into electrical energy, preferably a solar cell, so that the collected light hits this in concentrated form.

The light-guide system preferably conducts light by total internal reflection. The device is preferably characterised in that the light-guide system has at least one wavelength-selective mirror, which is preferably selected from one or more cholesteric liquid-crystal layers.

The device according to the invention is preferably characterised in that it comprises one or more glass layers which have an antireflection design. The production of antireflection coatings is carried out by coating methods of thin-film technology. These include, for example, physical gas-phase deposition, such as thermal evaporation and sputtering deposition. The antireflection measure can be achieved by a single-layer system or by a multilayer system.

The device according to the invention is preferably characterised in that it comprises two or more glass layers, and in that the degree of light reflection $\rho_v$ in accordance with Standard EN410 of the totality of the layers of the device with the exception of switchable layer S is less than 35%, preferably less than 30%, particularly preferably less than 25% and very particularly preferably less than 20%.

The degree of light reflection $\rho_v$ in accordance with Standard EN410 of the totality of the layers of the device with the exception of switchable layer S is particularly preferably as indicated above, and the device comprises three or more glass layers.

The degree of light reflection $\rho_v$ of the device is determined by measuring the spectral degrees of reflection of the layer arrangement using a spectrophotometer and by calculating the parameter $\rho_v$ therefrom in accordance with Standard EN410, equation (4), taking into account the relative spectral distribution of the standard illuminant and the spectral degree of brightness sensitivity of the standard observer.

The device according to the invention can be used for any desired rooms, in particular for rooms which have only limited exchange of air with the environment and have light-transmitting boundary surfaces through which the input of energy can take place from the outside in the form of light energy. The device is preferably mounted on a light-transmitting surface or in an opening of a building, a container, a vehicle or another substantially closed space. The device is particularly preferably used for rooms which are subjected to strong insolation through light-transmitting surfaces which are transparent to light, for example through window areas.

The device according to the invention is preferably suitable for the homogeneous regulation of the entry of light into a room through a surface. Homogeneous here is taken to mean that the entry of light through the surface is of equal strength over a relatively large area. The area is preferably at least 0.01 m², particularly preferably at least 0.1 m², very particularly preferably at least 0.5 m², and most preferably at least 1 m². Homogeneous, i.e. even, is to be taken as being patterned in order to distinguish it or divided into domains (pixeled), as is the case in optical switching devices which are used in display devices. Slight deviations from homogeneity, in particular if they are caused by defects, are neglected in this definition.

The invention furthermore relates to the use of the device according to the invention for the homogeneous regulation of the entry of light into a room through a light-transmitting surface.

The device according to the invention can also additionally be employed for aesthetic room design, for example by generating light and colour effects. It can also be used for signal generation. For example, door and wall elements containing the device according to the invention can be switched from an opaque, for example grey or coloured state, into a transparent state. The device may also comprise white or coloured full-area backlighting which is modulated in brightness, or yellow full-area backlighting, which is modulated in colour by means of a blue guest/host display. Further aesthetic effects can be generated by light sources incident from the side, such as white or coloured LEDs, in combination with the device according to the invention. It is also possible for one or both glass sides of the device according to the invention to be provided with roughened or structured glass for the coupling-out of light or for the generation of light effects.

In a preferred embodiment, the device according to the invention is part of a window, particularly preferably a window with multipane insulating glass. One or both of the optional substrate layers of the device here may represent the panes of the window.

The window containing the device preferably comprises a total of three or more glass panes. It is preferred here for the device to be arranged between two glass panes of the window.

According to a preferred embodiment, the device is applied in the interior of multipane insulating glass or to the outside of a glass of this type. Preference is generally given to the use on a side of a pane facing towards the interior space or in the interspace between two glass panes in the case of multipane insulating glass. However, other arrangements are also conceivable and to be preferred in certain cases. The person skilled in the art will be able to weigh up advantages and disadvantages of certain arrangements with respect to the durability of the device, optical and aesthetic points of view, practical points of view with respect to cleaning of the panes and with respect to the reactivity of the device to changes in temperature.

Particular preference is given to an arrangement in which a first glass pane of the window is formed by a glass pane of the device, so that the layer sequence of the window comprising the device is as follows:
1) Glass layer
2) Electrically conductive layer, preferably ITO layer
3) Alignment layer
4) Switchable layer S
5) Orientation layer
6) Electrically conductive layer, preferably ITO layer
7) Glass layer
8) Glass layer,
where a free space is present between glass layers 7) and 8), which may be filled, for example, with an insulating gas, such as a noble gas.

The window is preferably arranged in such a way that layer 1) is adjacent to the outside and layer 8) is adjacent to the inside. However, a reverse arrangement is also possible and preferred under certain conditions.

The above-mentioned layer sequence may be supplemented by further layers, such as, for example, additional glass layers or protective layers, for example against UV radiation, against NIR radiation, against VIS radiation and/or against physical damage.

A window containing the device according to the invention can be obtained by retrofitting of an existing window in accordance with the prior art or by complete new production.

The device is preferably characterised in that it has an area of at least 0.05 m², preferably at least 0.1 m², particularly preferably at least 0.5 m² and very particularly preferably at least 0.8 m².

The device represents a switchable device. Switching of the device here is taken to mean a change in the light transmittance of the device. This can be utilised in accordance with the invention for regulating the passage of light through the device. The device is preferably electrically switchable.

In the case of electrical switching, the switching operation takes place through alignment of the molecules of the liquid-crystalline medium by the application of voltage. The at least one dichroic compound is thereby likewise aligned, causing a difference in the light transmittance of the device.

In a preferred embodiment, the device is switched from a state having high absorption, i.e. low light transmittance, which is present without voltage, into a state having lower absorption, i.e. higher light transmittance, by application of voltage.

The liquid-crystalline medium is preferably nematic in both states. The state without an applied voltage is preferably characterised in that the molecules of the liquid-crystalline medium, and thus the dichroic compounds, are aligned parallel to the surface of the device (homogeneous orientation). This is preferably achieved by a correspondingly selected orientation layer. The state under voltage is preferably characterised in that the molecules of the liquid-crystalline medium, and thus the dichroic compounds, are perpendicular to the surface of the device.

Preferably, at least a predominant part of the molecules of the liquid-crystalline medium of layer S in the state with an applied electrical voltage is aligned perpendicular to the plane of layer S.

In an alternative embodiment which is likewise possible and in certain cases preferred, the device is switched from a state having low absorption, i.e. high light transmittance, which is present without voltage, into a state having higher absorption, i.e. lower light transmittance, by application of voltage.

The liquid-crystalline medium is preferably nematic in both states. The state without an applied voltage is preferably characterised in that the molecules of the liquid-crystalline medium, and thus the dichroic compounds, are aligned perpendicular to the surface of the device (homeotropic orientation). This is preferably achieved by a correspondingly selected orientation layer. The state under voltage is preferably characterised in that the molecules of the liquid-crystalline medium, and thus the dichroic compounds, are parallel to the surface of the device. Preferably, at least a predominant part of the molecules of the liquid-crystalline medium of layer S in the state with an applied electrical voltage is aligned parallel to the plane of layer S.

DESCRIPTION OF THE REFERENCE NUMERALS

Figure 1:
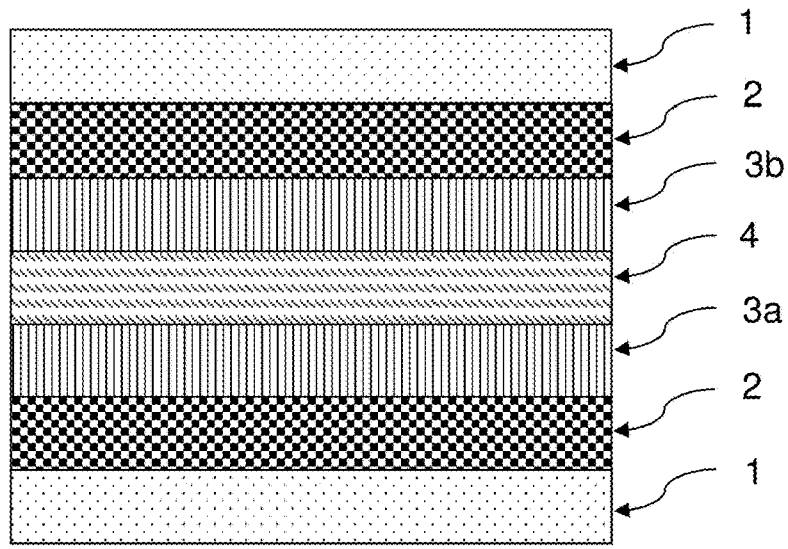
FIG. 1 shows a preferred layer sequence of a device according to the invention. Substrate layer (1), electrically conductive layer (2), orientation layer O1 (3a), switchable layer S (4), orientation layer O2 (3b), a further electrically conductive layer (2) and a further substrate layer (1) are arranged one behind the other and directly adjacent to one another here.
Figure 2:
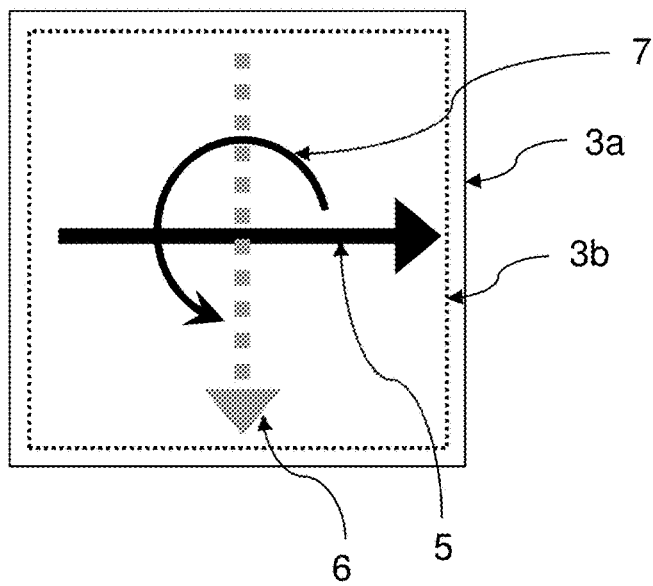
FIG. 2 shows a perpendicular view of orientation layers O1 (3a) and O2 (3b). O2 is behind O1, seen from the observer. Arrow (5) represents the rubbing direction of orientation layer O1. Arrow (6) represents the rubbing direction of orientation layer O2. Symbol (7) illustrates the twist of the liquid-crystalline compounds of the switchable layer between orientation layers O1 and O2. In the present case, the liquid-crystalline compounds describe a left-handed helix having an angle of rotation of 270° between orientation layers O1 and O2, since they are aligned parallel to the rubbing direction of O1 at the interface to O1, and are aligned parallel to the rubbing direction of O2 at the interface to O2.

1 Substrate layer, preferably comprising glass or polymer
2 Electrically conductive layer
3a Orientation layer O1
4 Switchable layer S
3b Orientation layer O2
5 Rubbing direction in orientation layer O1
6 Rubbing direction in orientation layer O2
7 Twist angle of the liquid-crystalline compounds of the switchable layer (left-handed helix if O2 is behind O1)

WORKING EXAMPLES

In the following text, structures of liquid-crystalline compounds are reproduced by abbreviations (acronyms). These abbreviations are explicitly presented and explained in WO 2012/052100 (pp. 63-89), so that reference is made to the said published application for an explanation of the abbreviations in the present application.

All physical properties are determined in accordance with "Merck Liquid Crystals, Physical Properties of Liquid Crystals", Status November 1997, Merck KGaA, Germany, and apply for a temperature of 20° C. The value of Δn is determined at 589 nm.

A) Production of the Devices

Devices E1 to E7 according to the invention and comparative devices V1 to V6 are produced.

The devices have the following layer sequence:

a) Glass layer comprising polished 1.1 mm soda-lime glass from Corning b) ITO layer, 200 Angström c) Orientation layer O1 comprising polyimide AL-1054 from JSR, 300 Angström, rubbed, or Nissan polyimide SE-3140, 300 Angström, rubbed d) Switchable layer comprising liquid-crystalline medium (composition and thickness indicated below in the case of the corresponding examples)

e) Orientation layer O2, built up like c); rubbed at the angle indicated below to the rubbing direction of layer c)

f) as b)

g) as a)

The ITO layers are correspondingly provided with contacts in order to be electrically switchable.

The following dopant

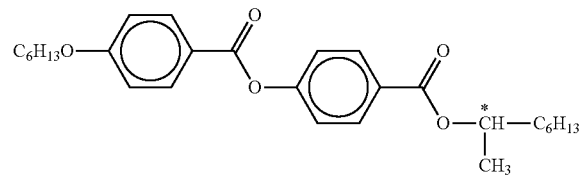

is added to the switchable layer in different concentration, depending on the desired twist.

The requisite concentration of dopant in weight percent is obtained using the following calculation:

$$c\ (\%) = 100/(p*11.94)$$

where p should be entered in μm, and the value for p is obtained as follows for the various thicknesses d of the layer and the various twist angles:

$p=d/0.10$ for 90° twist $p=d/0.40$ for 180° twist $p=d/0.48$ for 220° twist $p=d/0.53$ for 240° twist $p=d/0.57$ for 270° twist B) Materials Used
TABLE 1
Liquid-crystalline mixtures used
| H-1 | | H-2 | |
|---|---|---|---|
| Δn | | | |
| 0.1342 | | 0.0730 | |
| Composition | | | |
| Compound | % | Compound | % |
| CPG-3-F | 5 | CP-5-3 | 20 |
| CPG-5-F | 5 | CC-3-5 | 10 |
| CPU-3-F | 15 | CCU-2-F | 12 |
| CPU-5-F | 15 | CCU-3-F | 10 |
| CP-3-N | 16 | CCU-5-F | 8 |
| CP-5-N | 16 | CCEG-3-F | 10 |
| CCGU-3-F | 7 | CCEG-5-F | 10 |
| CGPC-3-3 | 4 | CCG-3-OT | 10 |
| CGPC-5-3 | 4 | CCG-5-OT | 10 |
| CGPC-5-5 | 4 | | |
| CCZPC-3-3 | 3 | | |
| CCZPC-3-4 | 3 | | |
| CCZPC-3-5 | 3 | | |
TABLE 2
Dyes used
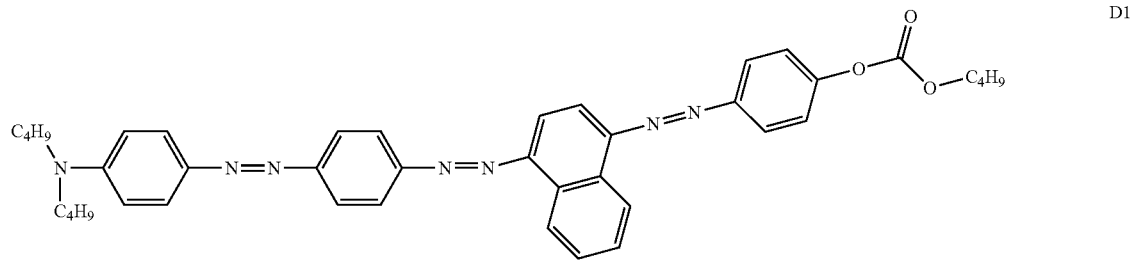
D1
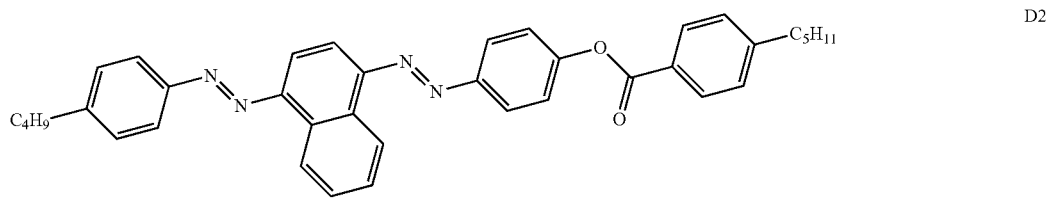
D2
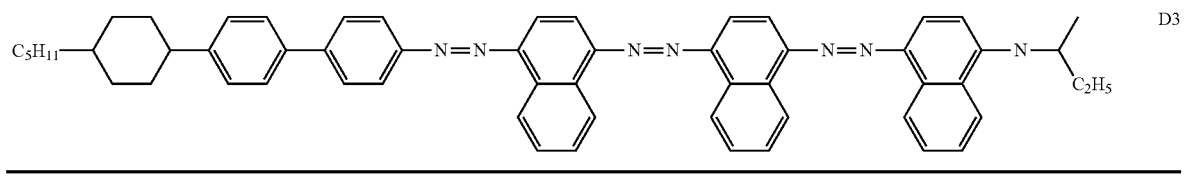
D3

C) Results Obtained

In all cases, the devices are switched from the dark state into the bright state by application of a voltage between the electrodes. The light transmittance in each of the two states is determined in accordance with the EN410 standard, equation (1).

C-1) Example 1

The bright transmission $\tau_{v\ bright}$ in both cases is 70%.

| | Host | Dyes in the ratio of the proportions | Total dye conc. in % by weight * μm | Thickness d of the switching layer in μm | d * Δn in μm | Twist (angle between the rubbing directions of O1 and O2) | Dark transmission $\tau_{v\ dark}$ |
|---|---|---|---|---|---|---|---|
| E1 | H1 | D1:D2:D3 1:0.8:2 | 19 | 5 | 0.67 | 240° | 20.6% |
| V1 | see above | see above | see above | 25 | 3.36 | 0° | 36.0% |

Device E1 according to the invention has significantly lower dark transmission and thus, for the same bright transmission, a significantly greater range than comparative device V1. The comparative device is characterised by a twist of 0° and a value of d*Δn in μm of greater than 2.

C-2) Example 2

The bright transmission $\tau_{v\ bright}$ in both cases is 59.7%.

| | Host | Dyes in the ratio of the proportions | Total dye conc. in % by weight * μm | Thickness d of the switching layer in μm | d * Δn in μm | Twist (angle between the rubbing directions of O1 and O2) | Dark transmission $\tau_{v\ dark}$ |
|---|---|---|---|---|---|---|---|
| E2 | H1 | D1:D2:D3 1:0.8:2 | 28 | 5 | 0.67 | 240° | 13.1% |
| V2 | see above | see above | see above | 25 | 3.36 | 0° | 30.0% |

Device E2 according to the invention has significantly lower dark transmission and thus, for the same bright transmission, a significantly greater range than comparative device V2. The comparative device is characterised by a twist of 0° and a value of d*Δn in μm of greater than 2.

C-3) Example 3

The bright transmission $\tau_{v\ bright}$ in both cases is 79.3%.

| | Host | Dyes in the ratio of the proportions | Total dye conc. in % by weight * μm | Thickness d of the switching layer in μm | d * Δn in μm | Twist (angle between the rubbing directions of O1 and O2) | Dark transmission $\tau_{v\ dark}$ |
|---|---|---|---|---|---|---|---|
| E3 | H1 | D1:D2:D3 1:0.8:2 | 12.6 | 5 | 0.67 | 240° | 31.2% |
| V3 | see above | see above | see above | 25 | 3.36 | 0° | 42.8% |

Device E3 according to the invention has significantly lower dark transmission and thus, for the same bright transmission, a significantly greater range than comparative device V3. The comparative device is characterised by a twist of 0° and a value of d*Δn in μm of greater than 2.

C-4) Example 4

The bright transmission $\tau_{v\ bright}$ in both cases is 69.9%.

|    | Host | Dyes | Total dye conc. in % by weight * μm | Thickness d of the switching layer in μm | d * Δ n in μm | Twist (angle between the rubbing directions of O1 and O2) | Dark transmission $\tau_{v\ dark}$ |
|----|------|------|-------------------------------------|------------------------------------------|---------------|-----------------------------------------------------------|------------------------------------|
| E4 | H1        | D1        | 12.5      | 5    | 0.67 | 240° | 24.8% |
| V4 | see above | see above | see above | 25   | 3.36 | 0°   | 38.0% |

Device E4 according to the invention has significantly lower dark transmission and thus, for the same bright transmission, a significantly greater range than comparative device V4. The comparative device is characterised by a twist of 0° and a value of d*Δn in μm of greater than 2.

C-5) Example 5

The bright transmission $\tau_{v\ bright}$ in all cases is 71.0%.

|      | Host | Dyes | Total dye conc. in % by weight * μm | Thickness d of the switching layer in μm | d * Δ n in μm | Twist (angle between the rubbing directions of O1 and O2) | Dark transmission $\tau_{v\ dark}$ |
|------|------|------|-------------------------------------|------------------------------------------|---------------|-----------------------------------------------------------|------------------------------------|
| V5-1 | H1        | D1        | 12.0      | 24.19 | 3.25 | 0°   | 38.6% |
| V5-2 | see above | see above | see above | 5.94  | 0.81 | 0°   | 38.9% |
| V5-3 | see above | see above | see above | 3.00  | 0.40 | 0°   | 38.7% |
| V5-4 | see above | see above | see above | 24.19 | 3.25 | 240° | 37.2% |
| E5-1 | see above | see above | see above | 5.94  | 0.81 | 240° | 27.8% |
| E5-2 | see above | see above | see above | 3.00  | 0.40 | 240° | 21.7% |

Devices E5-1 and E5-2 according to the invention have significantly lower dark transmission and thus, for the same bright transmission, a significantly greater range than comparative devices V5-1 to V5-4. The comparative devices are characterised by a twist of 0° and/or a value of d*Δn in μm of greater than 2.

C-6) Example 6

The bright transmission $\tau_{v\ bright}$ in all cases is 71.0%.

|      | Host | Dyes | Total dye conc. in % by weight * μm | Thickness d of the switching layer in μm | d * Δ n in μm | Twist (angle between the rubbing directions of O1 and O2) | Dark transmission $\tau_{v\ dark}$ |
|------|------|------|-------------------------------------|------------------------------------------|---------------|-----------------------------------------------------------|------------------------------------|
| V6-1 | H1        | D1        | 12.0      | 24.19 | 3.25 | 90°  | 38.6% |
| V6-2 | see above | see above | see above | 24.19 | 3.25 | 0°   | 38.6% |
| V6-3 | see above | see above | see above | 5.94  | 0.81 | 0°   | 38.9% |
| V6-4 | see above | see above | see above | 3.00  | 0.40 | 0°   | 38.7% |
| E6-1 | see above | see above | see above | 5.94  | 0.81 | 90°  | 38.2% |
| E6-2 | see above | see above | see above | 5.94  | 0.81 | 240° | 27.8% |
| E6-3 | see above | see above | see above | 5.94  | 0.81 | 270° | 26.4% |
| E6-4 | see above | see above | see above | 3.00  | 0.40 | 90°  | 29.4% |
| E6-5 | see above | see above | see above | 3.00  | 0.40 | 270° | 20.7% |

Devices E6-1 to E6-5 according to the invention have significantly lower dark transmission and thus, for the same bright transmission, a significantly greater range than comparative devices V6-1 to V6-4. Comparative device V6-1 is characterised by a value of d*Δn of greater than 2 μm. Comparative devices V6-2 to V6-4 are characterised in that they have no twist. In the case of the devices according to the invention, the value of d*Δn and the twist are varied. It is apparent here that, in particular, a combination of low value for d*Δn and a high twist results in a very large range.

C-7) Example 7

The bright transmission $T_{bright}$ at 545 nm in all cases is 61.0%.

| | Host | Dyes | Total dye conc. in % by weight * | Thickness d of the switching layer in μm | d * Δ n in μm | Twist (angle between the rubbing directions of O1 and O2) | Dark transmission $\tau_{dark}$ at 545 nm |
|---|---|---|---|---|---|---|---|
| E7-1 | H1 | D1 | 12.0 | 5.94 | 0.81 | 240° | 20% |
| E7-2 | H2 | see above | see above | 5.94 | 0.44 | 240° | 12% |
| E7-3 | H1 | see above | see above | 5.94 | 0.81 | 270° | 19% |
| E7-4 | H2 | see above | see above | 5.94 | 0.44 | 270° | 12% |
| E7-5 | H1 | see above | see above | 3.00 | 0.40 | 270° | 12% |
| E7-6 | H2 | see above | see above | 3.00 | 0.22 | 270° | 10% |

Devices E7-1 to E7-6 according to the invention have different host mixtures and different values for d*Δn. It is apparent that it is in fact the value d*Δn and not directly the thickness of the switchable layer that influences the values obtained for the dark transmission.

The invention claimed is:

1. A window containing a device for regulating the transmission of light into a room, comprising a switchable layer S comprising a liquid-crystalline medium which comprises at least two different dichroic compounds,
where the following applies to the thickness d of layer S and the optical anisotropy Δn of the liquid-crystalline medium of layer S:

$d<2$ μm/Δ$n$ wherein the molecules of the liquid-crystalline medium of switchable layer S are in a twisted nematic state in a switching state of the device and the switchable layer S is switchable between two different transmission levels, wherein the transmission level is determined by whether an electrical voltage is being applied or not being applied,
wherein the liquid crystalline medium has a clearing point in the temperature range from 70° C. to 170° C., and
wherein the device is colourless when looked through in all its switching states.

2. The device according to claim 1, wherein the following applies to the thickness d of layer S and the optical anisotropy Δn of the liquid-crystalline medium of layer S:

$d<0.9$ μm/Δ$n$ and $d>0.2$ μm/Δ$n$.

3. The device according to claim 1, wherein precisely one orientation layer, called O1, is adjacent to one side of the switchable layer S, and precisely one other orientation layer, called O2, is adjacent to the opposite side of the switchable layer S.

4. The device according to claim 3, wherein orientation layers O1 and O2 are in such a way that they each effect orientation axes of the molecules of the liquid-crystalline medium with different alignments in the adjacent region of layer S.

5. The device according to claim 3, wherein the rubbing directions of orientation layers O1 and O2 include an angle of 30 to 270°.

6. The device according to claim 3, wherein orientation layers O1 and O2 effect a homogeneous arrangement of the molecules of the liquid-crystalline medium of layer S adjacent to the orientation layer.

7. The device according to claim 3, wherein orientation layers O1 and O2 have rubbed polyimide on their surface adjacent to layer S.

8. The device according to claim 3, wherein the orientation axes of the molecules of the liquid-crystalline medium of layer S in the case of homogeneous alignment in the state without an applied voltage include an angle of 1° to 10° with the plane of orientation layer O1 or O2.

9. The device according to claim 3, wherein the orientation axes of the molecules of the liquid-crystalline medium of layer S in the case of homeotropic alignment in the state without an applied voltage include an angle of 89° to 80° with the plane of orientation layer O1 or O2.

10. The device according to claim 1, which does not include a polariser.

11. The device according to claim 1, wherein layer S has a thickness between 2 and 12 μm.

12. The device according to claim 1, wherein layer S has a light transmittance of the bright state $\tau_{v\ bright}$, calculated in accordance with European Standard EN410, equation (1), of at least 30%.

13. The device according to claim 1, wherein layer S comprises at least two different dichroic compounds.

14. The device according to claim 1, wherein at least one dichroic compound is selected from the group consisting of azo compounds, anthraquinones, methine compounds, azomethine compounds, merocyanine compounds, naphthoquinones, tetrazines, perylenes, terylenes, quaterylenes, higher rylenes, squaraines, benzothiadiazoles, diketopyrrolopyrroles and pyrromethenes.

15. The device according to claim 1, wherein the twist of the orientation axes of the molecules of the liquid-crystalline medium of layer S in the twisted nematic state, regarded over the entire layer thickness, is between 100° and 260°.

16. The device according to claim 1, the twist of the orientation axes of the molecules of the liquid-crystalline medium of layer S in the twisted nematic state, regarded over the entire layer thickness, is between 320° and three complete rotations.

17. The device according to claim 1, wherein the dielectric anisotropy Δε of the liquid-crystalline medium is greater than 3 or less than −3.

18. The device according to claim 1, wherein the liquid-crystalline medium comprises one or more chiral compounds in a total concentration of 0.01 to 3% by weight.

19. The device according to claim 1, which comprises a device for the conversion of light energy into electrical energy.

20. The device according to claim 1, which comprises one or more glass layers which have an antireflection characteristic.

21. The device according to claim 1, which has an area extent of at least 0.05 m$^2$.

22. The device according to claim 1, which is suitable for the homogeneous regulation of the entry of light into a room through a surface.

23. A method for the homogeneous regulation of the passage of light through a light-transmitting surface into a room comprising passing the light through the device according to claim 1.

24. A device for regulating the transmission of light into a room, comprising:
- a switchable layer S comprising a liquid-crystalline medium which comprises at least one dichroic compound, where the following applies to the thickness d of layer S and the optical anisotropy Δn of the liquid-crystalline medium of layer S:

$d<2\ \mu m/\Delta n$ wherein the molecules of the liquid-crystalline medium of switchable layer S are in a twisted nematic state in a switching state of the device and the switchable layer S is switchable between two different transmission levels, wherein the transmission level is determined by whether an electrical voltage is being applied or not being applied, wherein the liquid crystalline medium has a clearing point in the temperature range from 70° C. to 170° C., wherein the molecules of the liquid-crystalline medium are in a twisted nematic state and in a homogeneous alignment in the switching state of the device without an applied voltage and wherein the molecules of the liquid-crystalline medium are in an untwisted nematic state and in a homeotropic alignment in the switching state of the device with an applied voltage, and wherein the device is colourless when looked through in all its switching states.

* * * * *